United States Patent
Pukari

(10) Patent No.: US 11,988,538 B2
(45) Date of Patent: May 21, 2024

(54) WATER METER POWERED BY ENERGY PRODUCED FROM FLUID FLOW PRESSURE CHANGES

(71) Applicant: Ideavipu Oy, Helsinki (FI)

(72) Inventor: Mika Pukari, Helsinki (FI)

(73) Assignee: IDEAVIPU OY, Helsinki (FI)

( * ) Notice: Subject to any disclaimer, the term of this patent is extended or adjusted under 35 U.S.C. 154(b) by 0 days.

(21) Appl. No.: 18/364,988

(22) Filed: Aug. 3, 2023

(65) Prior Publication Data
US 2024/0060808 A1     Feb. 22, 2024

Related U.S. Application Data

(60) Provisional application No. 63/399,168, filed on Aug. 18, 2022.

(51) Int. Cl.
| | |
|---|---|
| *G01F 15/063* | (2022.01) |
| *G01F 1/34* | (2006.01) |
| *G01F 15/00* | (2006.01) |

(52) U.S. Cl.
CPC .............. *G01F 15/063* (2013.01); *G01F 1/34* (2013.01); *G01F 15/005* (2013.01)

(58) Field of Classification Search
CPC ......... G01F 15/063; G01F 1/34; G01F 15/005
USPC ....................................... 73/861.47
See application file for complete search history.

(56) References Cited

U.S. PATENT DOCUMENTS

| | | | | |
|---|---|---|---|---|
| 4,940,976 A | * | 7/1990 | Gastouniotis | G01F 15/066 340/870.31 |
| 2009/0322884 A1 | | 12/2009 | Bolick et al. | |
| 2015/0135852 A1 | | 5/2015 | Efimov et al. | |
| 2017/0085083 A1 | | 3/2017 | Berkcan et al. | |
| 2017/0234709 A1 | | 8/2017 | Mackie et al. | |
| 2018/0287034 A1 | * | 10/2018 | Artiuch | H10N 10/13 |

FOREIGN PATENT DOCUMENTS

| | | |
|---|---|---|
| CN | 210483947 U | 5/2020 |
| EP | 2314997 B1 | 8/2016 |

(Continued)

OTHER PUBLICATIONS

Energy Consumption Analysis of LPWAN Technologies and Lifetime Estimation for IoT Application, Ritesh Kumar Singh, Priyesh Pappinisseri Puluckul and Rafael Berkvens and Maarten Weyn, Sensors 2020, 20, 4794; doi: 10.3390/s20174794.

(Continued)

*Primary Examiner* — Nathaniel T Woodward
(74) *Attorney, Agent, or Firm* — Patterson + Sheridan, LLP

(57) ABSTRACT

A water meter reading device having a piston (503) or a membrane (527) that moves with the pressure changes of the water pipe (301, 501, 601) network is disclosed. The movement charges a capacitor (704) with electric energy released for reading the water meter. This makes it possible to realize the system without a battery, as the electricity needed for reading the water meter, and communicating the water meter reading to the water company, is used at the same moment that the electricity is generated. This also has the consequence that the water meter readings occur at the same time as the pressure changes in the water pipe (301, 501, 601) network.

14 Claims, 25 Drawing Sheets

(56) References Cited

FOREIGN PATENT DOCUMENTS

WO        2012021551 A1     2/2012
WO        2020215116 A1     10/2020

OTHER PUBLICATIONS

PCT, International Search Report and Written Opinion of The International Searching Authority for Application PCT/FI2023/050460 dated Nov. 13, 2023.
City of BloomingtonMN, "How it Works: Water Meter," Youtube.com, Year: 2014, Date Reaccessed: Dec. 5, 2023, pp. 1-12 https://www.youtube.com/watch?v=hxuFuT-RQyl.

* cited by examiner

*PRIOR ART*

20

WATER METER POWERED BY ENERGY PRODUCED FROM FLUID FLOW PRESSURE CHANGES

TECHNICAL FIELD OF INVENTION

The invention relates to water piping systems. More particularly, the invention relates to water consumption measurement systems.

BACKGROUND

Clean water consumption increases relentlessly around the globe. Individual and family consumption and entity consumption of water consumed from water pipes and taps has been traditionally monitored with water meters. The consumer or business typically pays the bill for the consumed water, to the water company providing the water through the pipes, based on the water meter reading.

In order to produce a correct invoice, there is a necessity for the water company to obtain the water meter reading.

Prior art methods for reading the water meter involve a technician reading the water meter reading from the water meter with naked eye and noting it down with a pen and paper. This takes human labour.

The aforementioned process has also been modernised in the prior art to an extent where the technician reads the water meter with a portable electronic device and takes the water meter readings with him in the portable device. This avoids the need to use pen and paper. See for example https://www.youtube.com/watch?v=hxuFuT-RQyI.

EP2314997 discloses a method where leaks in pipes are detected with pressure and vibration. WO2020215116 discloses detecting fluid flow signals in a water pipe network, which fluid flow signals can be used to detect present and future leakage sites in the pipes. These documents are cited here as reference.

US2015/0135852 discloses a battery free meter for flowing media, for measuring fluid flow. The kinetic energy of the fluid motion, i.e. flow, powers this meter.

Remote water meter reading with a battery powered device is also possible in the prior art. Then a technician needs to visit the property from time to time to change batteries to the battery powered device.

A prior art low power transmission link is described in "Energy Consumption Analysis of LPWAN Technologies and Lifetime Estimation for IoT Application, Singh et al., 2020". This document is cited here as reference.

Solar powered photovoltaic solutions are also in the prior art. However, this restricts the water meter typically to outdoors. Remote water meter reading with an external power supply is also possible in the prior art, but a cabling needs to be provided from the mains power source to the water meter.

There are hundreds of millions, if not billions of functioning water meters installed, many of which have mechanical memory. Quite clearly improvements are needed in this technological field.

SUMMARY

Aspects of the invention under study are directed towards a system and a method for effectively reading a legacy water meter remotely, without a technician and without a battery in the reading device.

This is achieved by harnessing the pressure changes in the water pipe network to produce the energy and power that reading the water meter requires from time to time. This allows accurate water meter reading even in properties that are vacant for extended periods of time, for example due to the resident of the property being on a trip. This is because the neighbours of the resident still produce pressure changes in the water pipe network, powering the water meter reading device of the absent resident without a battery.

In one aspect of the invention, the water department changes the water pipe pressure from time to time deliberately to power the reading of a water meter or a plurality of water meters. For example, the water department can send a pressure change into the water pipe network, preferably by first lowering the pressure and then increasing it. This pressure pulse should be small enough to be structurally safe for that water pipe network, but big enough in hydrostatic pressure change to generate an electric power pulse sufficient to read and transmit the water meter reading to a radio data receiver of the water department.

A further object of the invention is to realise wide scale self-powered self-reading of water meters for water companies.

In one aspect of the invention a legacy water meter has a mechanical memory. For example, there are revolving counter readings in the water meter that display the amount of water consumed. An aspect of the invention involves a piston that moves with the pressure in the water pipe. Increased pressure in the water pipe causes the piston to be pushed and move a spring into compression or move a lever or a gear box harnessing mechanical energy. The mechanical energy is used to rotate an electromagnetic motor, which acts as a generator, and the electric power therefrom is used to power a sensor and a memory to capture the consumption reading of the water meter, and transmit the consumption reading data to the water company using a communication link. The consumption reading may be captured in alphanumeric or binary data form for example from a digital memory. Or an image of the consumption reading in the water meter may also be captured when the sensor includes a camera for example from a mechanical water meter counter.

Some or all of the aforementioned advantages of the invention are accrued with a device that has a piston or a membrane, which moves with the pressure changes of the water pipe network, and whose movement charges a capacitor with electric energy released for reading the water meter. This makes it possible to realise the system without a battery, as the electricity needed for reading the water meter, and communicating the water meter reading to the water company, is used at the same moment that electricity is generated. This of course also has the consequence that the water meter readings occur at the same time as the pressure changes in the water pipe network.

If the energy or power budget of the inventive system proves to be insufficient in a use environment, it is in accordance with the invention to also store the generated electrical energy into a battery.

A water meter reading system in accordance with the invention is a self-powered water meter reading system deriving operation power from pressure changes of the fluid in the water pipeline network.

An on-site self-powered water meter reading and transmitter system is in accordance with the invention and derives its operation power from pressure changes of the fluid in the water pipeline network, and the reading and transmitter system comprises a piston or a membrane configured to load a spring of a spring-loaded generator to extract mechanical energy from pressure changes in the water pipeline network.

An on-site self-powered water meter reading and transmitter system is in accordance with the invention and derives operation power from pressure changes of the fluid in the water pipeline network, and the reading and transmitter system comprises a piston or a membrane configured to load a spring of a spring-loaded generator to extract mechanical energy from pressure changes in the water pipeline network, and wherein, the piston is mechanically driven by pressure changes in the water pipeline network, and the piston drives a mechanical spring storing mechanical energy, and the said spring when released is configured to drive an electro-magnetic motor and generate electric power configured to power the reading of the water meter, and the transmission of the water meter reading to a receiver.

A method in accordance with the invention for powering a water meter read out, is characterized by the following steps,
  pressure changes in the water pipeline network,
  mechanical piston is driven by pressure change,
  kinetic energy of the piston is stored as potential energy in a mechanical spring,
  the potential energy stored in the mechanical spring is converted into electricity with an electric motor,
  the electricity obtained is used to power the reading of a water meter.

A method for powering a water meter read out, motion detector for a tap, or opening of a water valve on-site is in accordance with the invention and, characterized by the following steps,
  pressure changes in the water pipeline network,
  mechanical piston is driven by pressure change,
  kinetic energy of the piston is stored as potential energy in a mechanical spring,
  the potential energy stored in the mechanical spring is converted into electricity with an electric motor,
  the electricity obtained is used to power the reading of a water meter, and to power a transmitter to send the water meter reading to a receiver, and the system comprises a piston or a membrane to extract mechanical energy from pressure changes in the water pipeline network.

A software program product in accordance with the invention is stored in a non-transient memory medium, and the software program product is configured to receive water meter readings from a plurality of water meters powered by pressure changes in the water pipeline network.

A software program product in accordance with the invention is stored in a non-transient memory medium and is configured to receive water meter readings from a plurality of on-site water meters powered by pressure changes in the water pipeline network, and the software program is configured to receive and store water meter readings received via wireline or wireless communication network, when there is a pressure change in the water pipeline network.

A method for powering a water meter read out, motion detector for a tap, or opening of a water valve on-site is in accordance with the invention and characterized by the following steps,
  pressure changes in the water pipeline network,
  mechanical piston is driven by pressure change,
  kinetic energy of the piston is stored as potential energy in a mechanical spring,
  the potential energy stored in the mechanical spring is converted into electricity with an electric motor,
  the electricity obtained is used to power the reading of a water meter, and to power a transmitter to send the water meter reading to a receiver and the system comprises a piston or a membrane to extract mechanical energy from pressure changes in the water pipeline network, and the piston is mechanically driven by pressure changes in the water pipeline network, and the piston drives a mechanical spring storing mechanical energy, and the said spring when released is configured to drive an electro-magnetic motor and generate electric power configured to power the reading of the water meter, and the transmission of the water meter reading to a receiver.

Aspects of the invention have a number of advantages. The water department can collect water meter readings without sending technicians to the site of water consumption to replace batteries or do the read out of the water meter. Already installed legacy water meters may be used, and additional installation of a reading device does not alter any existing water distribution infrastructure, except that the reading device needs to be connected to the water pipe network by a plumber. Further, as the water department knows that the water distribution network will itself produce the consumption readings from the water meters automatically, the water department can automate other business processes around the water meter readings that have been produced, for example invoicing.

In addition, and with reference to the aforementioned advantage accruing embodiments, the best mode of the invention for existing water meters is considered to be a small meter reading device, which captures a photographic image of the water meter consumption reading, that is installed with the water pipe network. For buildings and retrofit installations that do have an existing operational older water meter, the best mode of the invention is considered an integrated water meter and water meter reading device, which has the same length and connector sizes as the existing old water meter. The water meter reading device derives energy using a piston or membrane from the changes in hydrostatic and kinetic pressure in the water pipe. The mechanical movement of the piston or membrane is converted to electricity with an electromagnetic motor, which produces a burst of charge to a capacitor at the time of the pressure change. The capacitor then releases the electric power generated, to power the circuitry reading the water meter consumption reading. Using the power released from the capacitor, the water meter reading device also communicates the water meter readouts to the water department, at the time of the consumption read out, using LPWAN, Wireless M-Bus, Bluetooth and/or Zigbee communication technologies, and the readouts are time stamped in the water department when the read outs are received. In the best mode there is no clock at the water meter end, as the clock would consume power.

BRIEF DESCRIPTION OF THE DRAWINGS

In the following the invention will be described in greater detail with reference to exemplary embodiments in accordance with the accompanying drawings, in which.

Some of the embodiments are described in the dependent claims.

DETAILED DESCRIPTION OF EMBODIMENTS

Figure 1A:
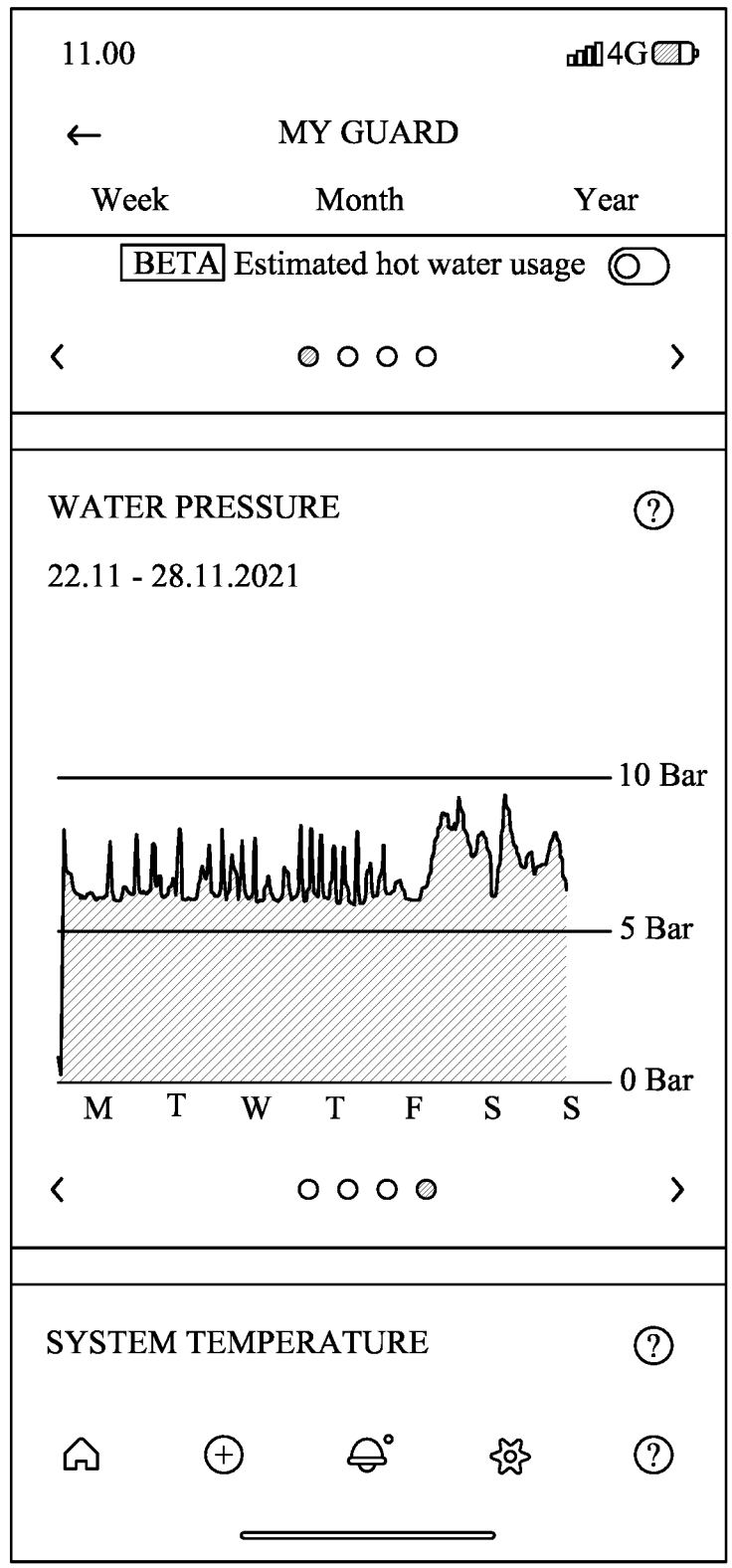
FIG. 1A demonstrates a prior art screenshot 10 from a prior art app showing water pressure changes over time in a domestic water pipe.

FIG. 1A demonstrates a prior art screenshot 10 from a prior art mobile application showing water pressure changes over time in a domestic water pipe. Time is plotted on the X-axis, as Monday, Tuesday, Wednesday and so on. As one can see, most of the pressure changes are of intra-day duration. These are due to events like filling/emptying a bathtub, flushing a toilet, or from the operation of a dishwasher and/or laundry machine. The pressure change in the water pipe is typically 1-3 Bars. The pressure changes on Friday, Saturday, and Sunday present a situation when the tenant was away. These events and pressure changes thus show that water usage by neighbours etc. can lead to considerable pressure changes in the water pipe network of a property, even when the tenant of that property is absent.

The pressure changes are caused by hydrostatic pressure changes, and the pressure associated with the kinetic component of the fluid flow, when fluid flows.

Figure 1B:
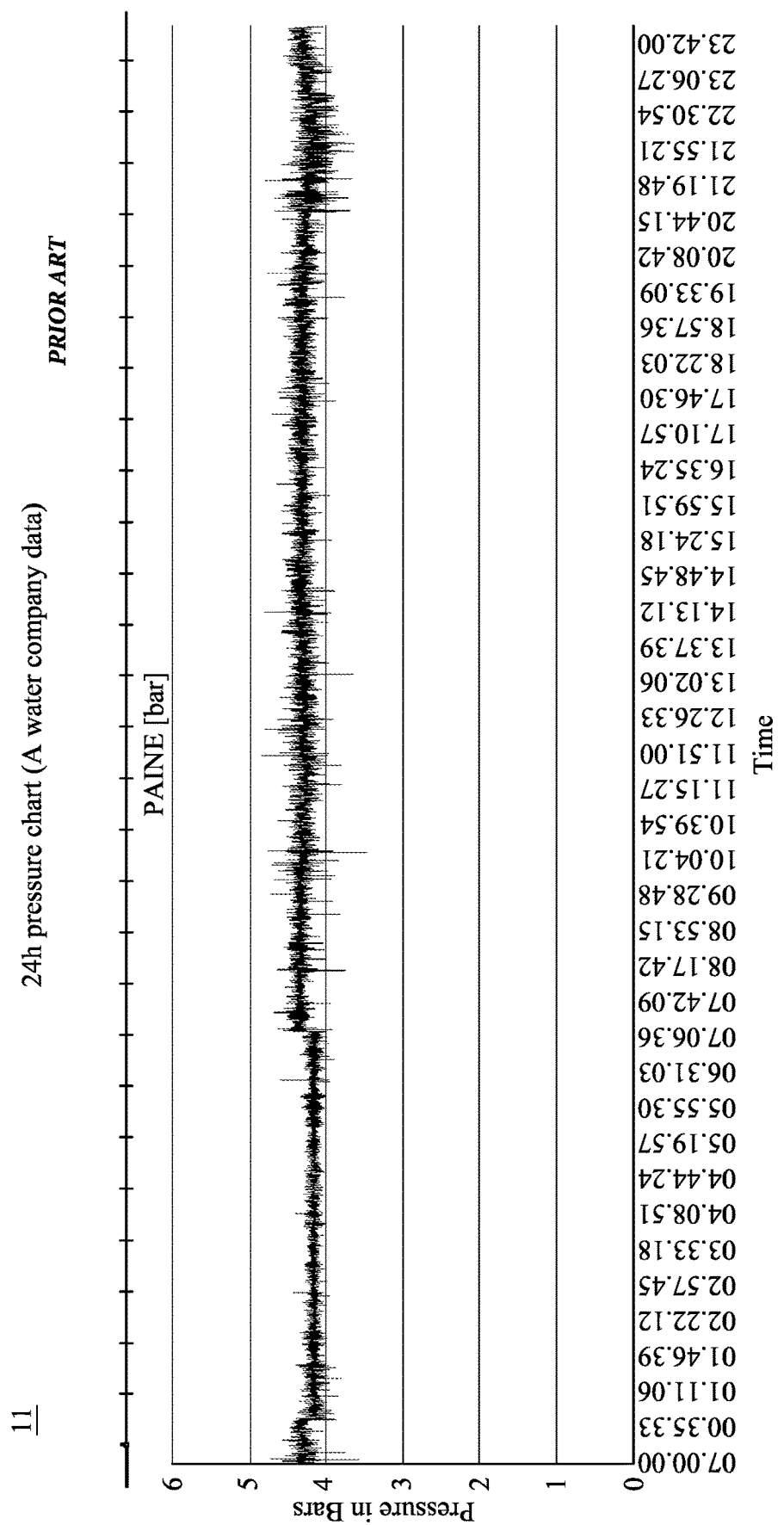
FIG. 1B demonstrates a 24-hour pressure chart 11 measured by a water company showing water pressure changes in bars (Y-axis) over time (X-axis) in a water pipe network.

FIG. 1B shows a 24-hour water pressure chart 11, where X-axis has time, and Y-axis shows the pressure in bars. This chart has been recorded by a water department. As we can see the peak-to-through pressure differential varies quite a bit. For most of the time, the peak-to-through pressure differential is around 0.3. Occasionally the peak-to-through pressure differential exceeds 1 bar.

Figure 1C:
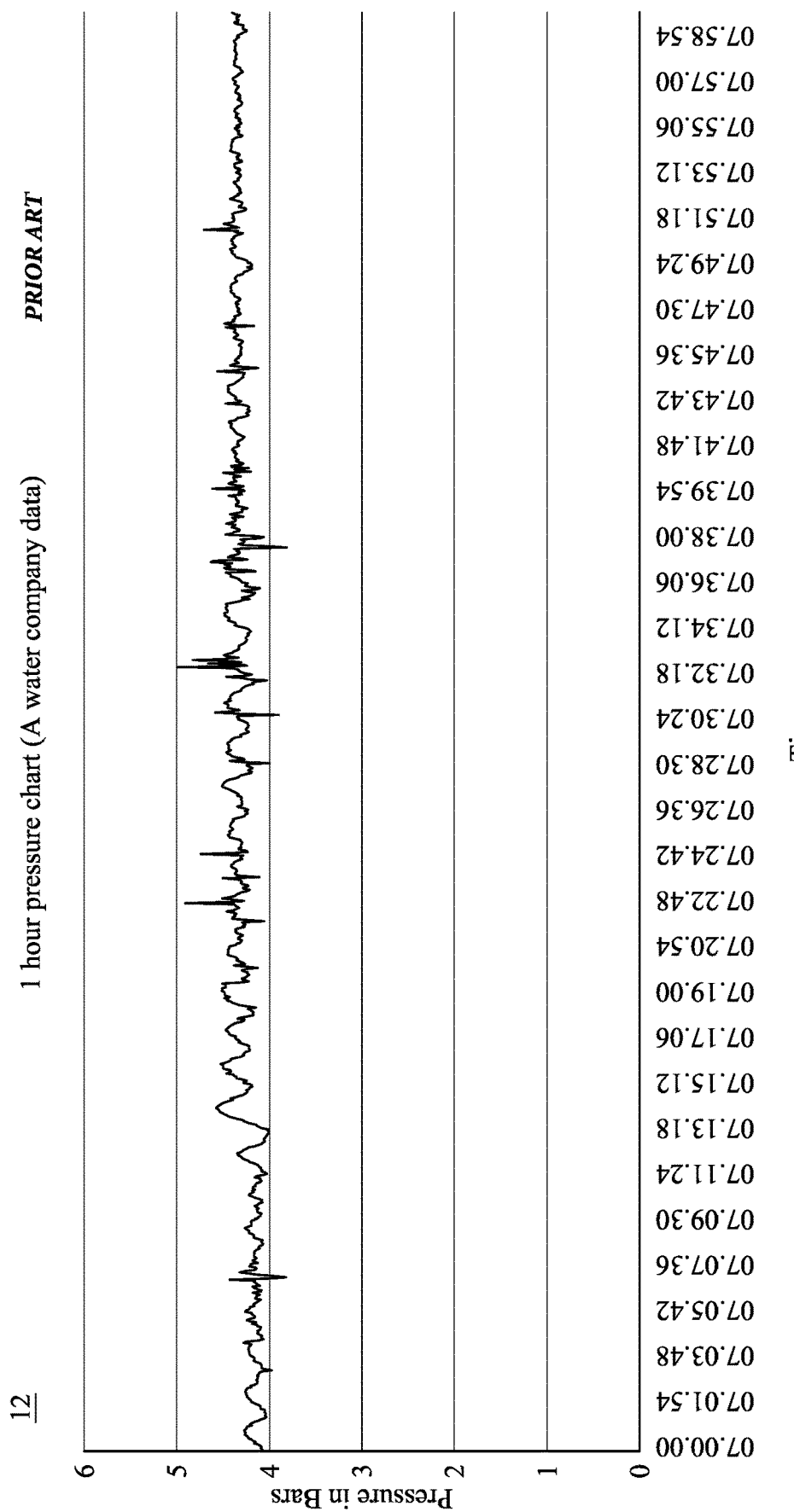
FIG. 1C demonstrates a 1-hour pressure chart 12 measured by a water company showing water pressure changes in bars (Y-axis) over time (X-axis) in a water pipe network.

FIG. 1C shows a 1-hour pressure chart 12 where X-axis has time, and Y-axis shows the pressure in bars. This chart has been recorded by a water department. This chart confirms our findings of FIG. 1B with better time resolution, in that for most of the time, the peak-to-through pressure differential is around 0.3. Occasionally the peak-to-through pressure differential exceeds 1 bar.

These observations have the consequence, that if there is no energy storage over time in use, the energy budget of a hydrostatic pressure change of 1 bar is likely to be available sometime during the day, but the energy budget of a hydrostatic pressure change of 0.3 bar is likely to be available almost all the time. Both FIGS. 1B & 1C show measurements from a water pipe network that is in active use, i.e. there is water consumption.

Figure 1D:
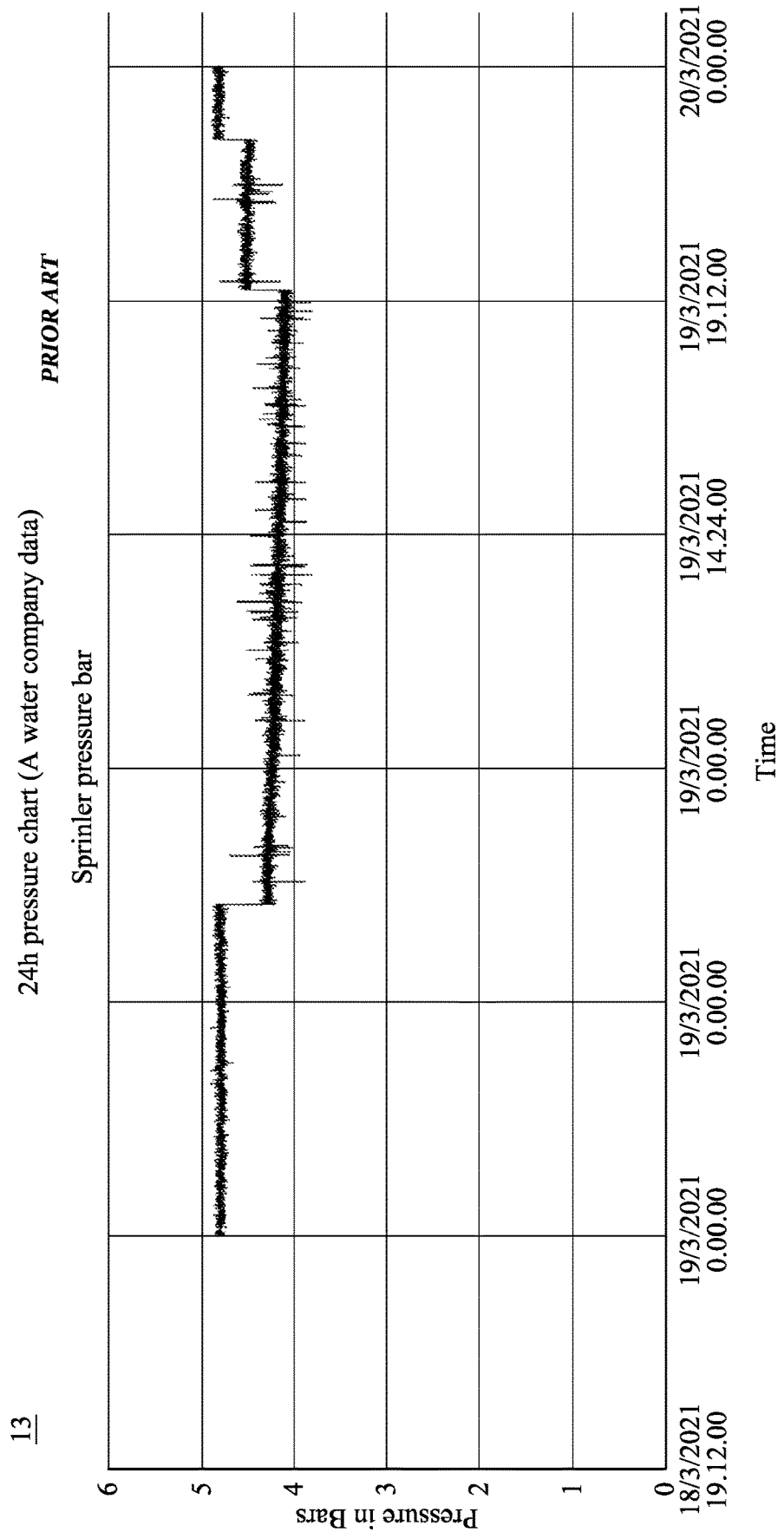
FIG. 1D demonstrates a 24-hour pressure chart 13 measured by a water company showing water pressure changes in bars (Y-axis) over time (X-axis) in a water pipe network of a sprinkler where there is no consumption of water during the time period.

FIG. 1D shows a 24-hour pressure chart 13 recorded by a water department from a sprinkler system that does not have any own consumption during the time period. Here the peak-to-through pressure changes are smaller than in a network with own water consumption. This chart only shows pressure changes that are caused by factors external to own consumption. The peak-to-through pressure differential is 0.1 bar or more most of the time. Occasionally peak-to-through pressure differential of 0.5 bar is encountered.

The power budget obtained from the pressure change can perhaps be approximated as with a hydraulic system, wherein Power (W)=Pressure (Pa)*Q (volumetric flow). Looking at FIG. 1C, the pressure changes of 0.3 bar occur in a timeframe t of 1-10 s. If we assume a pressure change of 0.3 bar=30000 Pa and a piston area of 0.005 m$^2$, and a piston movement of 0.005 m, power in the hydrostatic pressure change is 30,000 kg m$^{-1}$ s$^{-2}$*0.005 m$^2$*0.005 m s$^{-1}$=0.75 W for t=1 s, 0.075 W for t=10 s. This power appears sufficient to overcome the inertial and friction forces in the energy harvesting system. The power consumed by the readout electronics and data processing can be made very small.

The energy budget can be approximated using the Work energy. Low pressure 4.0 bar (the trigger lever 508 actuates the spring loader 515 at this point), high pressure 4.5 bar (the trigger lever 508 releases the spring loader 515 at this point; the generator 510 is rotated by the mechanical energy stored in the torsional spring 514). Movement of the piston 506 is 5 mm at the said pressure difference. Diameter of the piston 506 is 80 mm. Due the compression spring 505, the force which moves the trigger lever 508 may be 50% of the pressure difference (4.5 bar−4.0 bar=0.5 bar) and the diameter of the piston 506 (d=80 mm=>0,005 m$^2$). The Force (F=P*A*50%) is 0.5*100 000 N/m$^2$*0.005 m$^2$*0.5=125N. The torsional spring 514 is loaded by moving the trigger lever 5 mm. In this lossless case (cos Φ=1) an amount of the energy (W) loaded to the torsional spring 514 is (W=F*s*cos Φ) 125N*0,005 m*1=0.63 Nm=0.63 Ws. For a pressure change of 0.3 bar, the same parameters as the power budget, the energy budget 0.38 Nm=0.38 Ws.

However, any information sent via a radio link will be subject to the Power=Intensity*4πr$^2$ relation, where r is the distance between transmitter and receiver of the communication link. Here the transmitter is approximated as a directionless, or all direction, spherical transmitter. The calculated work energies appear sufficient to power the reading of the current water meter consumption readings into a memory, and the transmission of these readings over a distance.

Consequently, the intensity of the transmission encoding the water meter reading at the water department end will diminish as r$^{-2}$, as the distance between the water meter and the receiver at the water department grows. Clearly, the water department can control r, the distance, for example by bringing the receiver closer, e.g. receiver 606 of FIG. 6C. Similarly, the water department can control pressure change to some extent, by for example producing a pressure change deliberately into the water pipe network, preferably by lowering the water pressure first, and then increasing it. The pressure change could be exerted for example by controlling the water level in a water tower, or by controlling water pumps. Furthermore, in the installation phase, the water department can also control the hydrostatic pressure change facing area of the piston or membrane, and the bigger this area the more hydraulic energy is captured.

In preferred embodiments of the invention, the piston dimensions, electronic components, and the link distance are selected so that a sufficient power is produced, enabling a sufficient signal intensity at the water department receiver, to receive and read the water meter reading.

Figure 2:
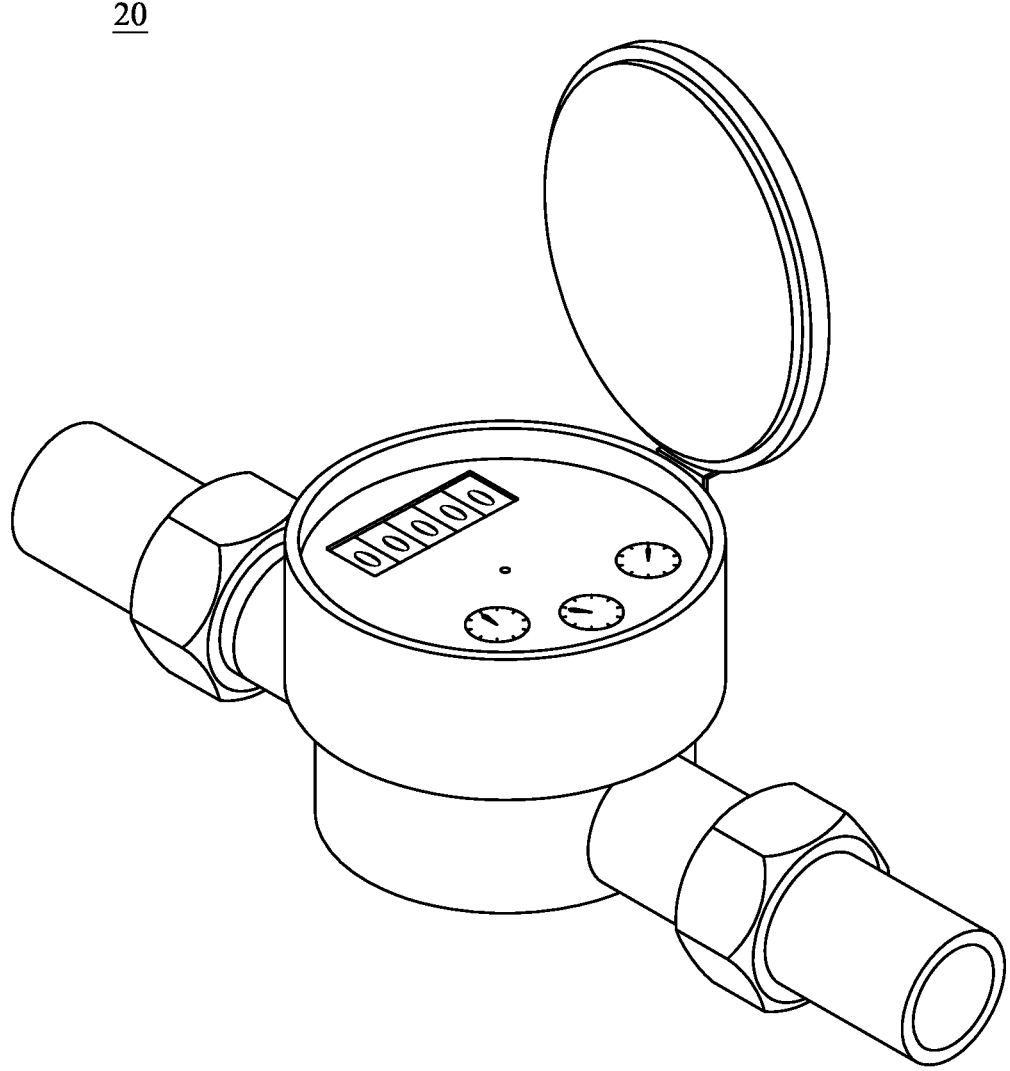
FIG. 2 demonstrates a prior art water meter 20.

FIG. 2 demonstrates a prior art water meter 20. The prior art water meter typically has mechanical means that has a response to fluid flow that can be equated with the volume of fluid that has flowed past it in a unit of time. The water meter 20 shows a consumption reading on the dial as numbers. Here these numbers are 00000 currently in FIG. 2. As fluid would flow in the pipe, this number would increase to display the volume of fluid that has flowed through the pipe to which this water meter is connected to.

Figure 3:
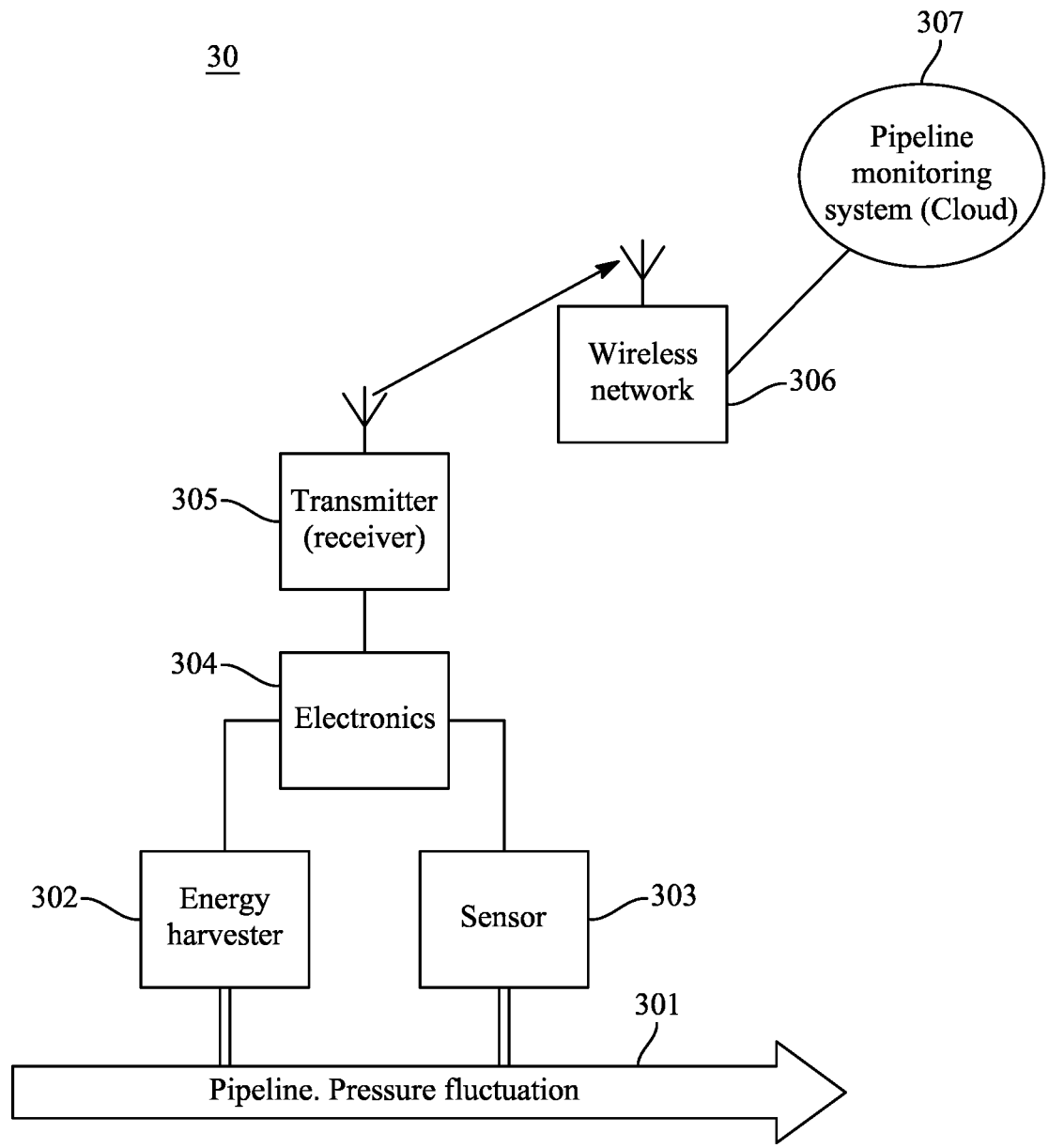
FIG. 3 demonstrates an embodiment 30 of the invention as a block diagram.

FIG. 3 demonstrates an embodiment 30 of the invention as a block diagram. The water pipe is shown as 301, and a sensor 303 is configured to measure the water flow through the water pipe 301. The sensor 303 could be any fluid flow measurement sensor, relying in for example optical, electrical, magnetic, or mechanical measurement, or a mix of the aforementioned measurement techniques. In one embodiment the prior art water meter 20 could operate as the sensor 303. Energy Harvester 302 is configured to harvest energy from water pressure changes in the water pipe 301. For example, the embodiment 50 shows an example of an energy harvester 302. The mechanical energy of pressure fluctuation is converted to electrical energy which is used to operate the Electronics 304. The Electronics 304 is configured to capture the sensor 303 reading, i.e., the water meter reading. The electronics 304 then uses the same power received from Energy Harvester 302 to power the Transmitter 305 and sends the captured water meter reading via a communication network, which may be wireless network 306, or wireline network, or both, in some embodiments of the invention to a Pipeline monitoring system 307. Pipeline monitoring system 307 is typically realised over a cloud computing network. The cloud computing network typically belongs to the water company operating the water pipe network and selling water to the owners of the property connected to the water pipe 301.

The wireless network 306 is typically a low power network such as LPWAN (Low Power Wireless Area Network), Zigbee, CAT-M1, Narrow Band iOT (NB-iOT), M-Bus or the like. However, in some embodiments of the invention the wireless network 306 may be a wireless Internet or the telephony network, which is typically a cellular network, such as UMTS- (Universal Mobile Telecommunication System), GSM- (Global System for Mobile Telecommunications), GPRS- (General Packet Radio Service), CDMA- (Code Division Multiple Access), 3G-, 4G-, 5G-, Wi-Fi and/or WCDMA (Wideband Code Division Multiple Access)-network. In some embodiments the wireless network connection 306 is replaced by a wireline communication connection, or wireline and wireless communication connections are used together in a mix to realize communication to the Pipeline Monitoring System 307, which is typically on a cloud server.

In an example, the cloud server 307 may comprise a plurality of servers (not shown). In an example implementation, the cloud server 307 may be any type of a database server, a file server, a web server, an application server, etc., configured to store data related to water metering. In another example implementation, the cloud server 307 may comprise a plurality of databases for storing the data files. The databases may be, for example, a structured query language (SQL) database, a NoSQL database such as the Microsoft® SQL Server, the Oracle® servers, the MySQL® database, etc. The cloud server 307 may be deployed in a cloud environment managed by a cloud storage service provider, and the databases may be configured as cloud-based databases implemented in the cloud environment.

The cloud server 307 may include an input-output device, and usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the cloud server 307 of some embodiments of the invention. The cloud server 307 can be purchased as a separate solution from known vendors such as Microsoft and Amazon and HP (Hewlett-Packard). The cloud server 307 typically runs Unix, Microsoft, iOS, Linux, or any other known operating system, and comprises typically a microprocessor, memory, and data storage means, such as SSD flash or Hard drives. To improve the responsiveness of the cloud architecture, the data is preferentially stored, either wholly or partly, on SSD i.e., Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using Flash as the backbone storage for the cloud server 307 is preferred due to its durability. Collected sensor data can be analysed using Artificial Intelligence (AI), for example to generate leak and/or fault alarms of the pipe network, detect theft, and optimize control of water pumps.

Any features of embodiment 30 may be readily combined or permuted with any of the other embodiments 30, 40, 50, 60, 61, 70, 80, 90, 91, 92, 93 and/or 94 in accordance with the invention.

Figure 4:
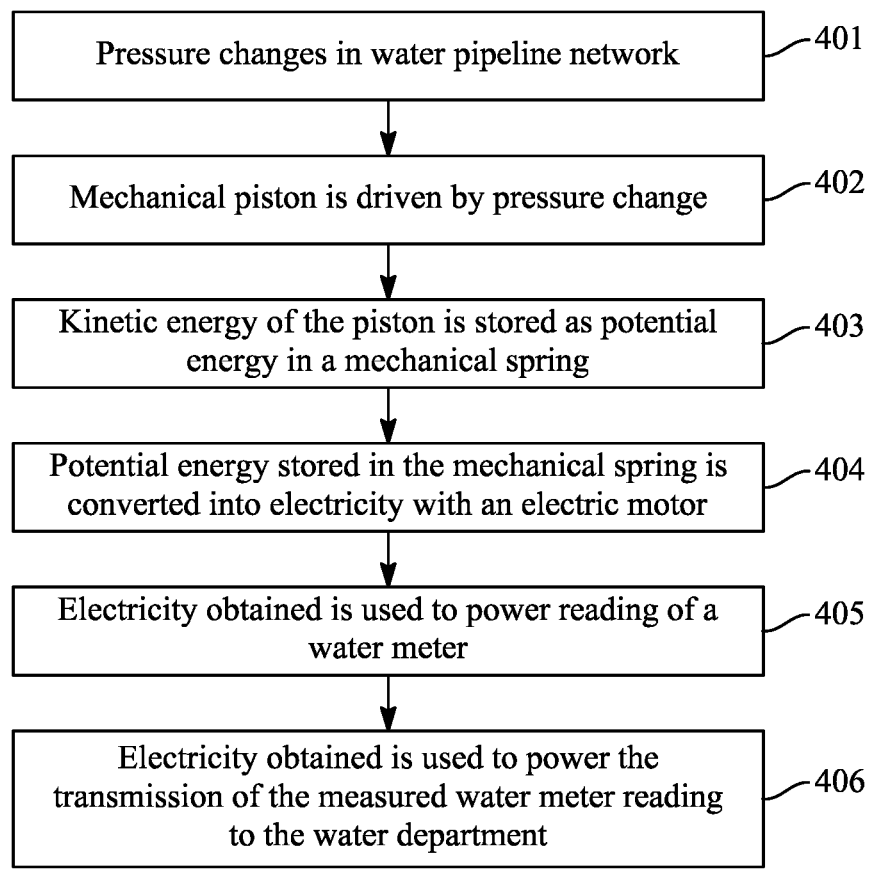
FIG. 4 demonstrates an embodiment 40 of the invention as a flow diagram.

FIG. 4 demonstrates an embodiment 40 of the invention as a flow diagram. In phase 401, the pressure changes in the water pipeline network, for example due to a leak, flushing a toilet, taking a bath, and the like. This fluid pressure change moves a mechanical piston in phase 402. The change can be an increase or a decrease of pressure, in accordance with the invention. In phase 403 the kinetic energy associated with the movement of the piston is stored as potential energy, for example in a mechanical spring. In phase 404 potential energy stored in the mechanical spring is converted into electricity with an electric motor. Finally, the electricity obtained in phase 404 is used to power the reading of a water meter in phase 405. And in phase 406 electricity obtained is used to power the transmission of the measured water meter reading to the water department. The communication link between the water department and the water meter needs to be sufficiently short distance, so that a sufficient transmission intensity from the water meter transmitter is recorded at the water department receiver. It is believed that a LPWAN link as described in the Singh et al. reference, could be used as the communication link between the water meter and the water department.

In some embodiments of the invention, it may be possible to convert kinetic energy also directly to electric energy, without using the said mechanical spring in energy transmission.

Any features of embodiment 40 may be readily combined or permuted with any of the other embodiments 30, 50, 60, 61, 70, 80, 90, 91, 92, 93 and/or 94 in accordance with the invention.

Figure 5A:
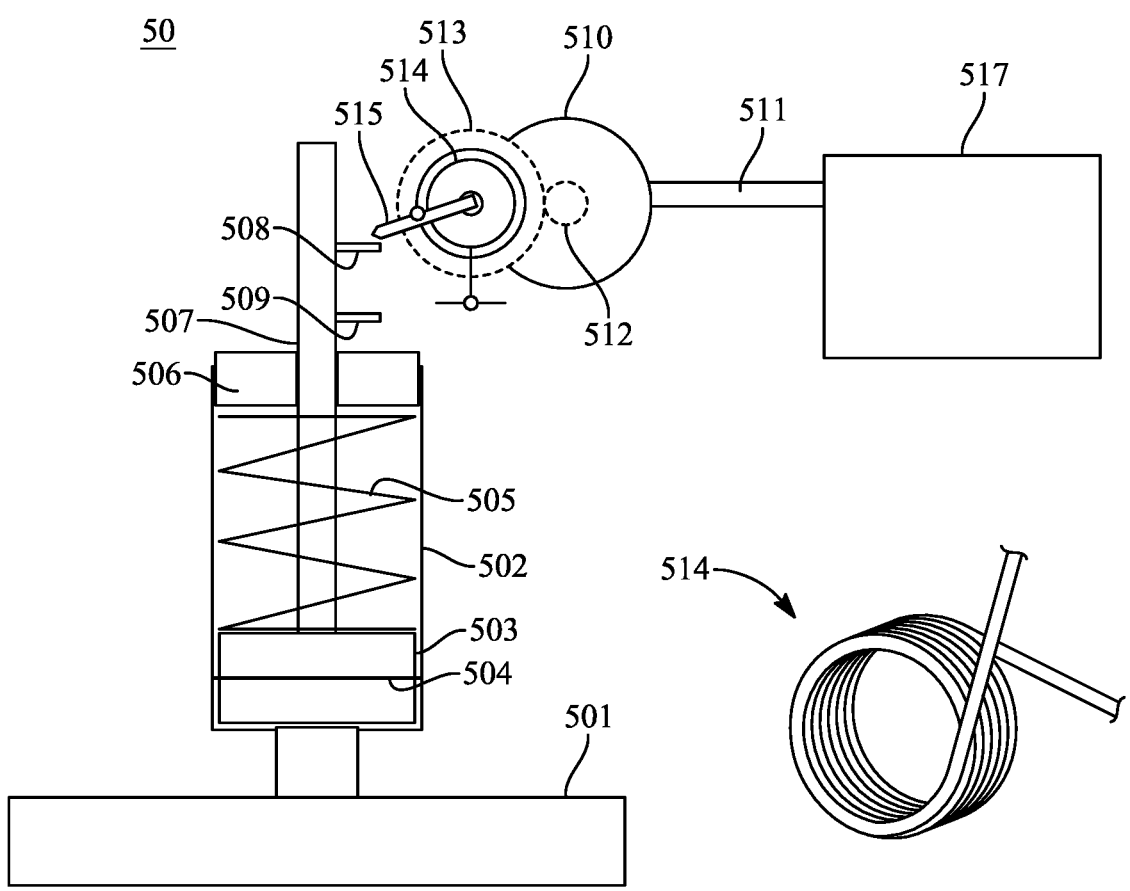
FIG. 5A demonstrates an embodiment 50 of the system of the invention as a schematic diagram in the initial state when the pressure in the water pipe is low.

FIG. 5A demonstrates an embodiment 50 of the system of the invention as a schematic diagram in the initial state when the pressure in the water pipe is low. Pipeline 501 is a typical water pipe, which might bring cold or hot water into the property. Pipeline 501 might bring drinkable water, or household water depending on what cleanliness standards are used at the water department. A Cylinder bore 502 is connected to the water pipe 501, and the cylinder bore 502 houses a piston 503, with a piston seal 504. The piston 503 moves with the pressure changes in the water pipe. There is a compression spring 505 designed to dampen the movement of the piston. Cylinder cover 506 position can be altered, typically by raising or lowering, and used to adjust the pressure range in which this energy harvester is designed to operate. Altering the spring constant of the compression spring 505 will have the same effect of adjusting the pressure range of operation in some embodiments of the invention. The shaft 507 is designed to transmit the kinetic energy onwards and has two trigger levers 508 and 509. The trigger levers 508 and 509 will go past the spring loader lever 515, when pressure in the pipe changes and the piston moves. The spring loader lever 515 moves the main gear wheel 513, which in turn moves the generator gear wheel 512. When this happens the torsional spring 514 is also moved and tightened, to ensure recovery of the spring loader lever 515 into initial position eventually. In FIG. 5A the torsional spring 514 initial position is drawn and, as the spring loader lever 515 moves the torsional spring 514 tightens from its initial position.

Figure 5B:
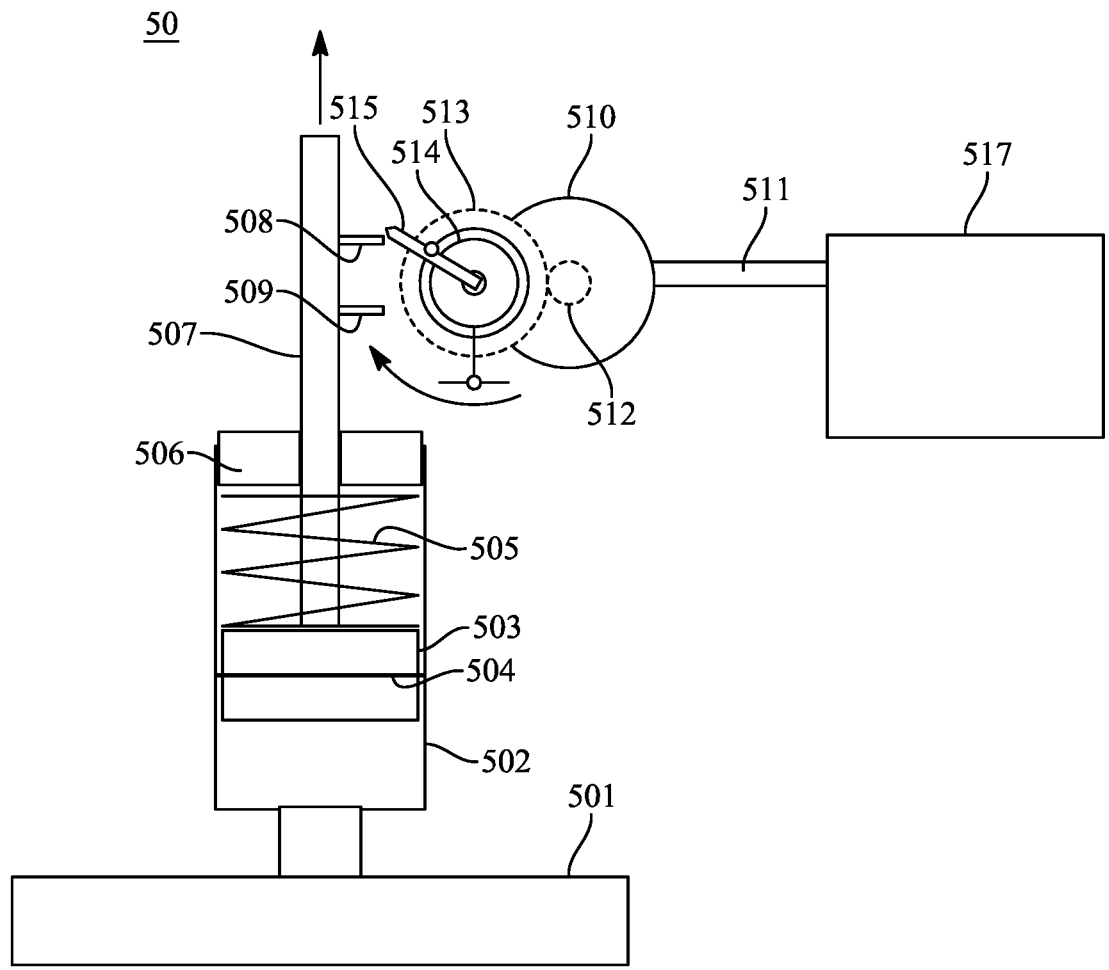
FIG. 5B demonstrates the embodiment 50 of the system of the invention as a schematic diagram after the initial state when the pressure in the water pipe has increased to first trigger level.

Let's observe the operation of embodiment 50 via series of FIGS. 5A-5G. FIG. 5B demonstrates the embodiment 50 of the system of the invention as a schematic diagram after the initial state, when the pressure in the water pipe 501 has increased, from the low-pressure level of FIG. 5A, to first trigger level where trigger lever 508 is pushing past spring loader 515. Pressure is reached to first trigger level, and torsional spring 514 is fully loaded. The generator 510 generates electricity based on this motion, which is transmitted via wires 511 to the electronics 517.

Figure 5C:
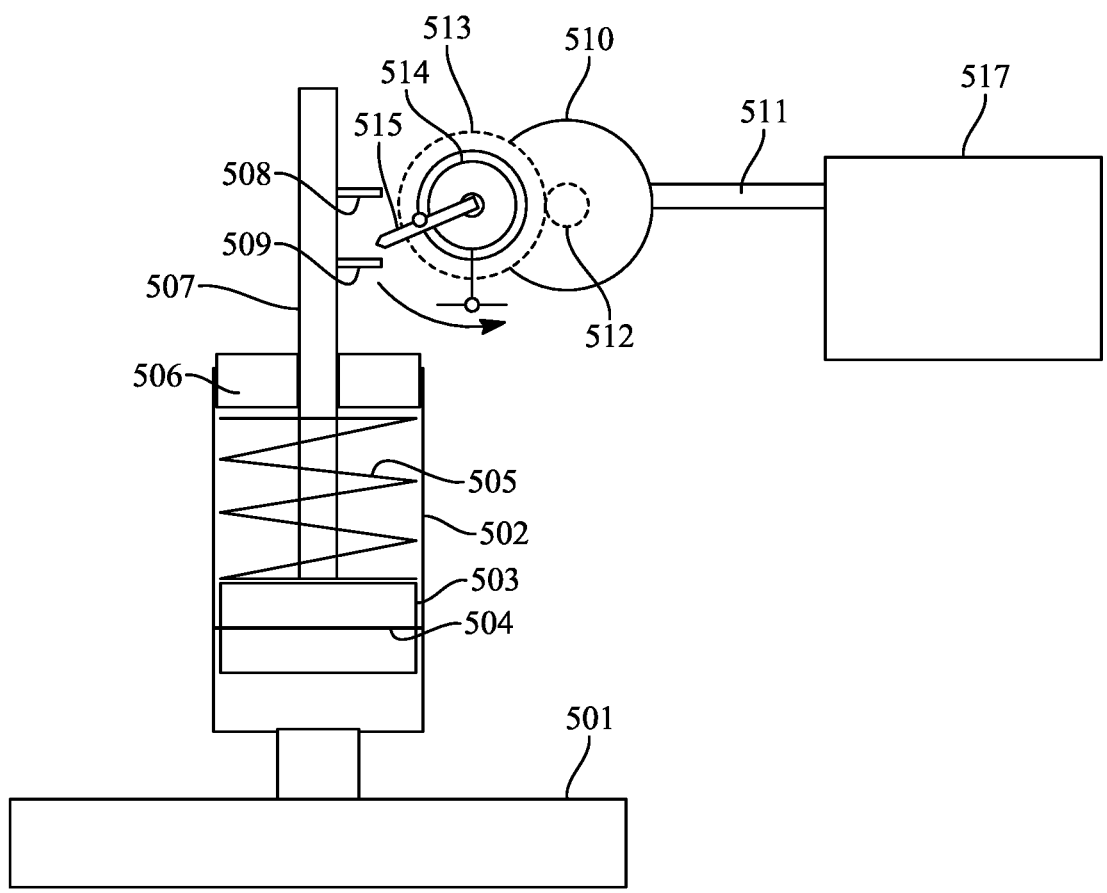
FIG. 5C demonstrates the embodiment 50 of the system of the invention as a schematic diagram after the initial state when the pressure in the water pipe has increased beyond first trigger level.

FIG. 5C demonstrates the embodiment 50 of the system of the invention as a schematic diagram after the initial state when the pressure in the water pipe 501 has increased beyond first trigger level. Spring loader 515 and torsional spring 514 are now released, and gear wheels 513 and 512 are rotated, and electric power is generated/harvested. The generator 510 generates electricity based on this motion, which is transmitted via wires 511 to the electronics 517.

It should be noted that if the pressure increases further, electric power is generated by trigger lever 509. In some embodiments, there may be several trigger levers, adapting the system to a different pressure range, and different pressure change steps within that range. Several trigger levels may be used to measure pressure. For example, trigger levels of water pressure=4 bar could be associated with lever 508, and trigger level 509 could be associated with water pressure=4.3 bar. It is in accordance with the invention that the number of levers could be increased, for example to include water pressures of 4.6 bars and 4.7 bars, or lesser water pressure level of 3.7 bars. The pressure levels could also be with a step of 0.5 bar in preferred embodiments, or in fact the pressure step can be of any size producing a favourable energy budget for the water meter reading and transmission.

Figure 5D:
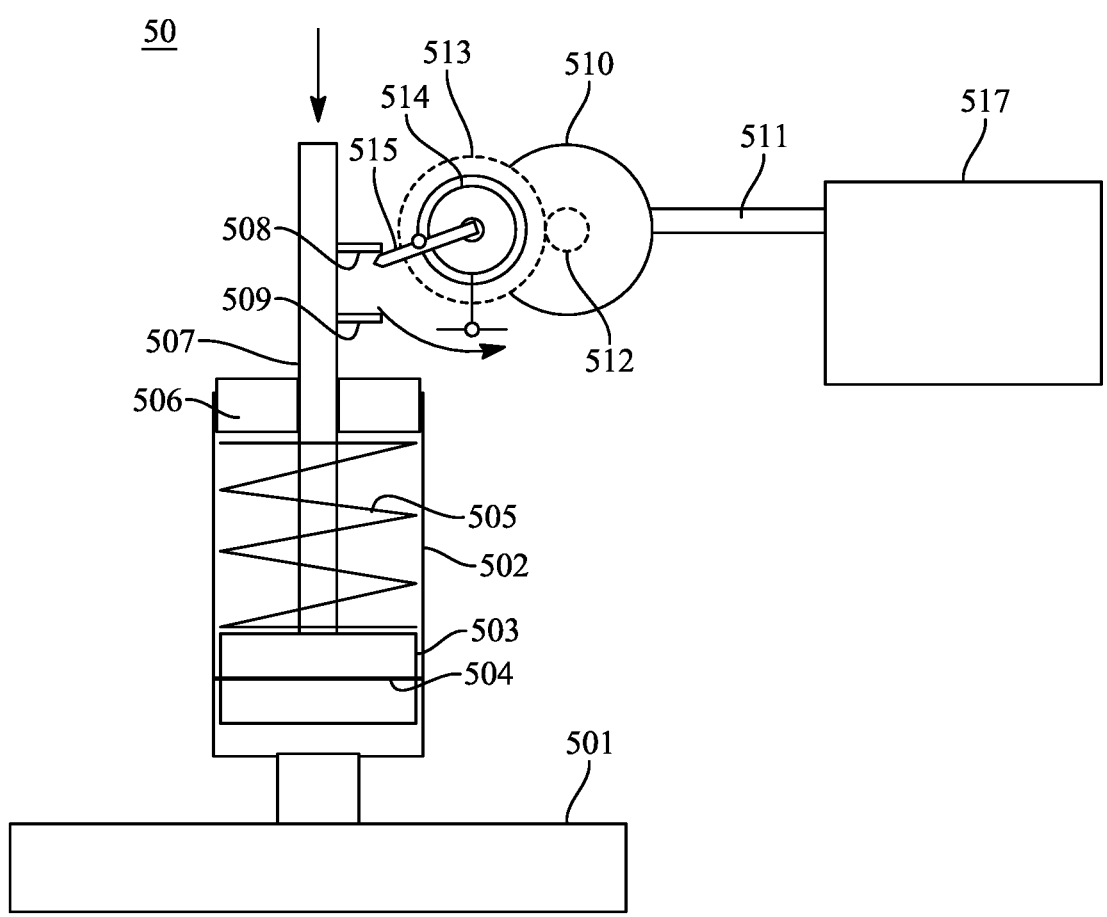
FIG. 5D demonstrates the embodiment 50 of the system of the invention as a schematic diagram after the initial state when the pressure in the water pipe is lowering to less than the first trigger level.

FIG. 5D demonstrates the embodiment 50 of the system of the invention as a schematic diagram after the initial state when the pressure in the water pipe 501 is lowering to less than the first trigger level, i.e., trigger lever 508 is passing the spring loader 515 while heading in the downward direction.

There are at least two options based on which the energy harvester can be configured in accordance with the invention:
1) No energy generation when pressure drops: this is a by-pass route for the spring loader 515 which returns to initial position eventually.
2) Energy is generated when pressure drops: energy comes then from the compression spring 505, which pulls shaft 507 back into equilibrium position with the water pipe 501 pressure.

Figure 5E:
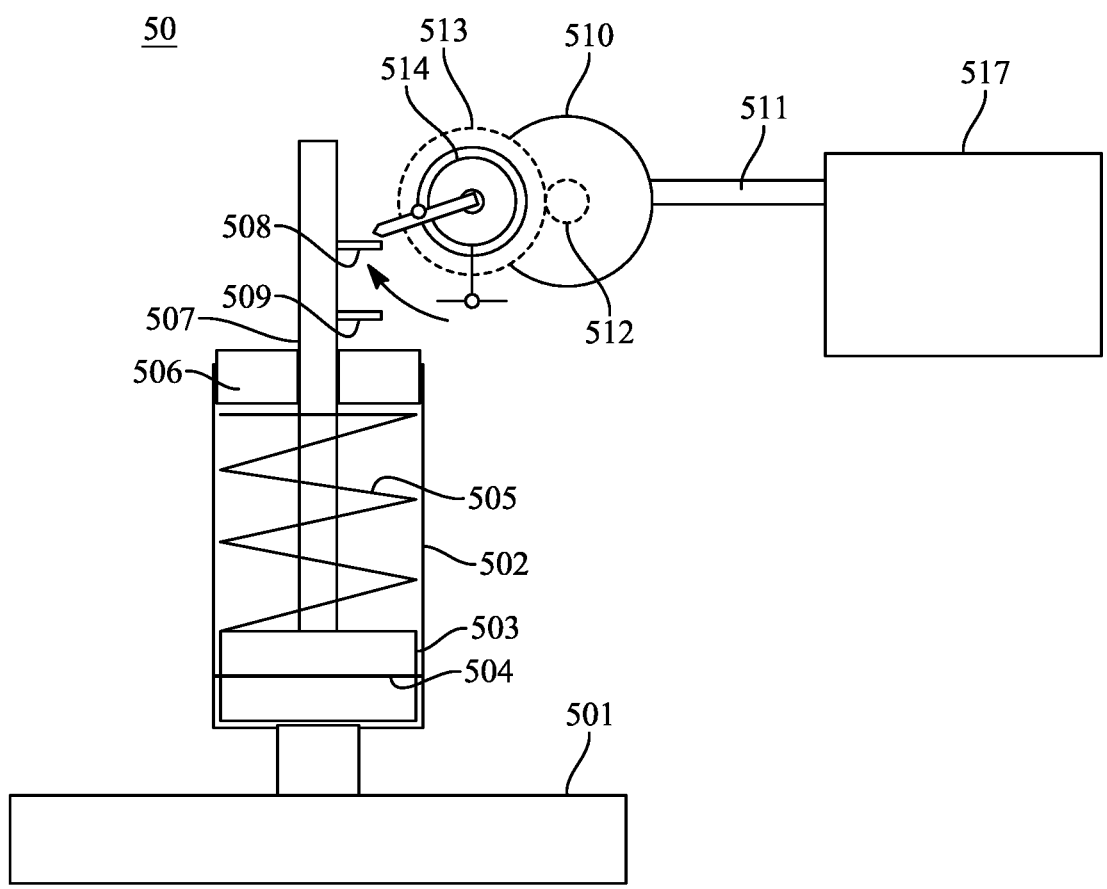
FIG. 5E demonstrates the embodiment 50 of the system of the invention as a schematic diagram after the initial state when the pressure in the water pipe has lowered below first trigger level back to initial state.

FIG. 5E demonstrates the embodiment 50 of the system of the invention as a schematic diagram after the initial state when the pressure in the water pipe 501 has lowered below first trigger level back to initial state. The pressure change cycle of the energy harvester 50 has now been completed.

Figure 5F:
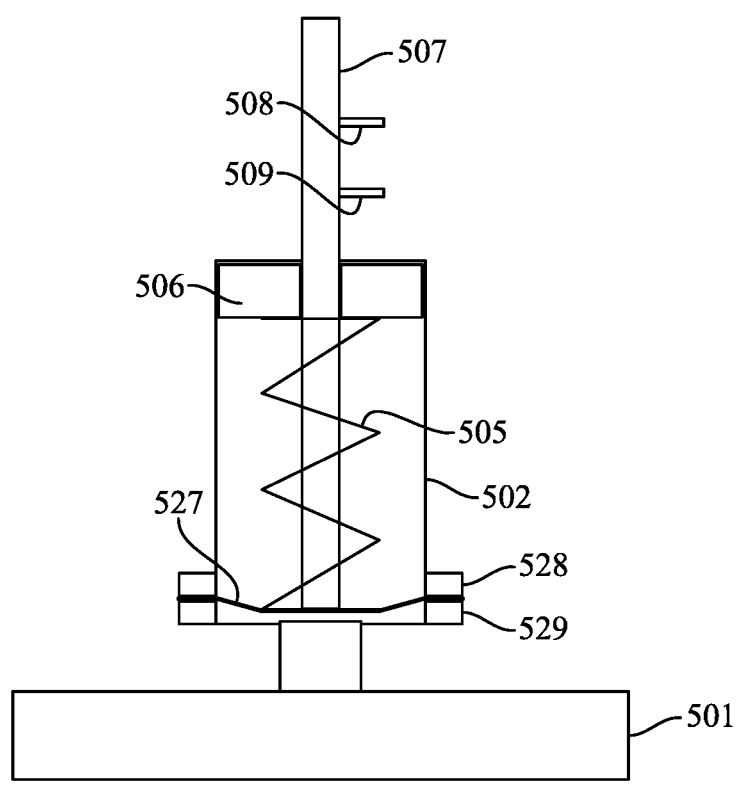
FIG. 5F demonstrates the embodiment 50F of the system of the invention as a schematic diagram the initial state when the pressure in the water pipe is different and the preload of the compression spring has been changed.

FIG. 5F demonstrates the embodiment 50 of the system of the invention as a schematic diagram in the initial state when the pressure in the water pipe 501 is different and the preload of the compression spring 505 has been changed.

Preload of the compression spring 505 may be adjusted by lowering or raising the cylinder cover 506. Here the piston is also replaced by a membrane 527, which is configured between flanges 528, 529. Here the pressure in pipe 501 is quite low, and the membrane 527 is in the rest state.

Figure 5G:
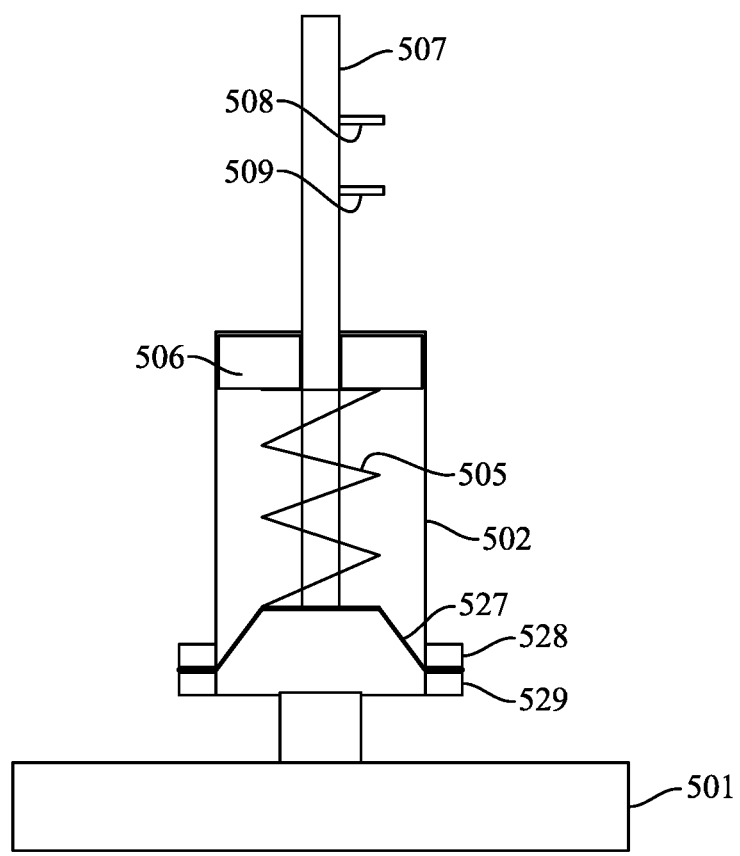
FIG. 5G demonstrates the embodiment 50G of the system of the invention as a schematic diagram in the initial state with a membrane acting as the piston.

FIG. 5G demonstrates the embodiment 50 of the system of the invention as a schematic diagram in the initial state with a membrane 527 acting as the piston 503. Membrane 527 isolates pressure and non-pressure sides. The practical application is a bit simpler than with the cylinder bore 502, piston 503 and its seal 504 in accordance with the invention. The membrane 527 is in between flanges 528, 529. Here the pressure in pipe 501 is quite high, and the membrane 527 is extended into the cylinder 502, and the membrane 527 has pushed the shaft 507 upwards.

Any features of embodiment 50 may be readily combined or permuted with any of the other embodiments 30, 40, 60, 61, 70, 80, 90, 91, 92, 93 and/or 94 in accordance with the invention.

Figure 6A:
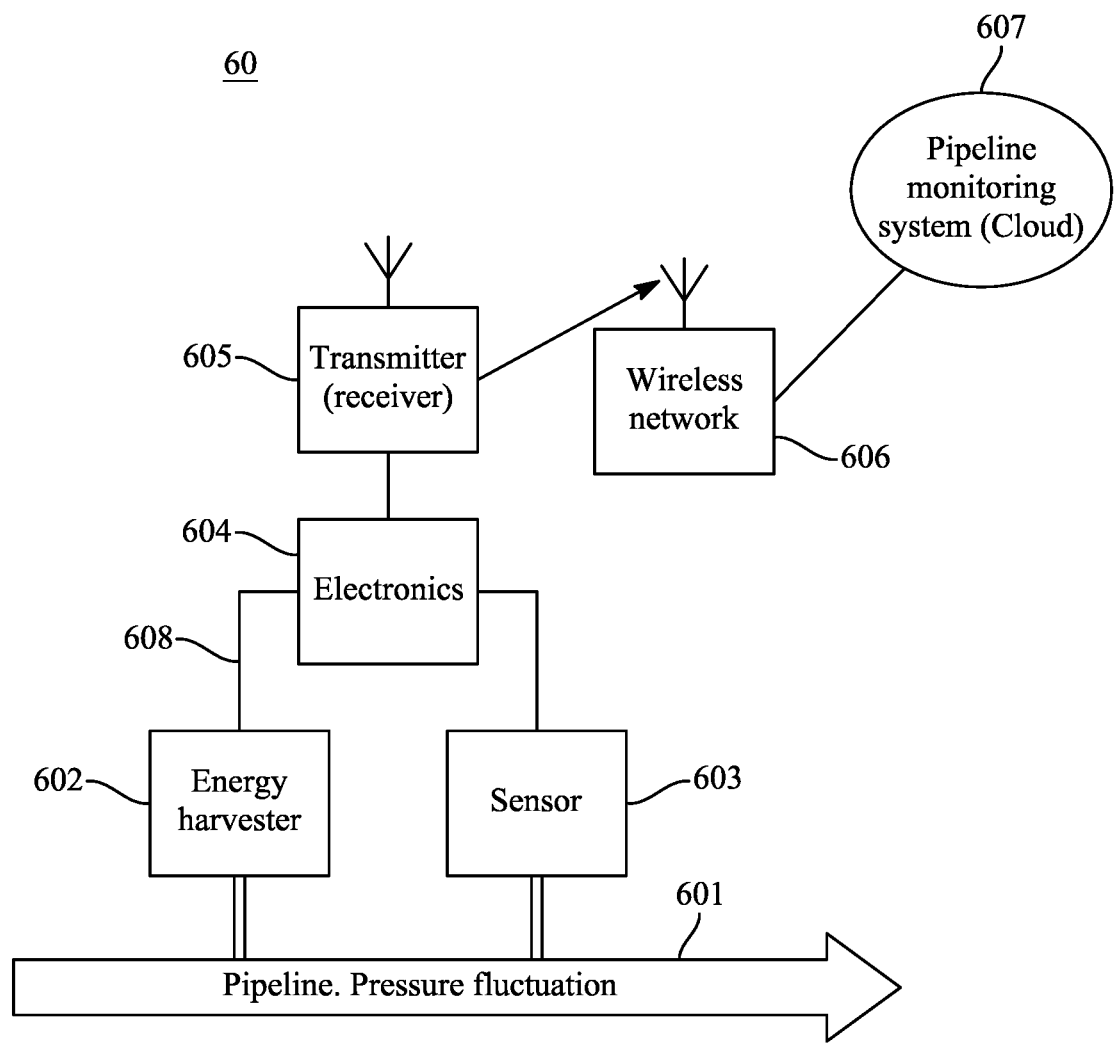
FIG. 6A demonstrates an embodiment 60 of the system of the invention using a Low Power Wireless Area Network to communicate the water meter reading to the water company via a communication network.

FIG. 6A demonstrates an embodiment 60 of the system of the invention using a Low Power Wireless Area Network to communicate the water meter reading to the water company via a communication network. The parts of the embodiment 60 substantially correspond to the parts explained in embodiment 30, but here the communication link is elected as a Low Power Wireless Area Network link. The energy Harvester 602 can be essentially any variant of embodiment 50 explained in FIGS. 5A-5G. The sensor 603 is a water meter, for example similar to the water meter 20 in FIG. 2.

Figure 6B:
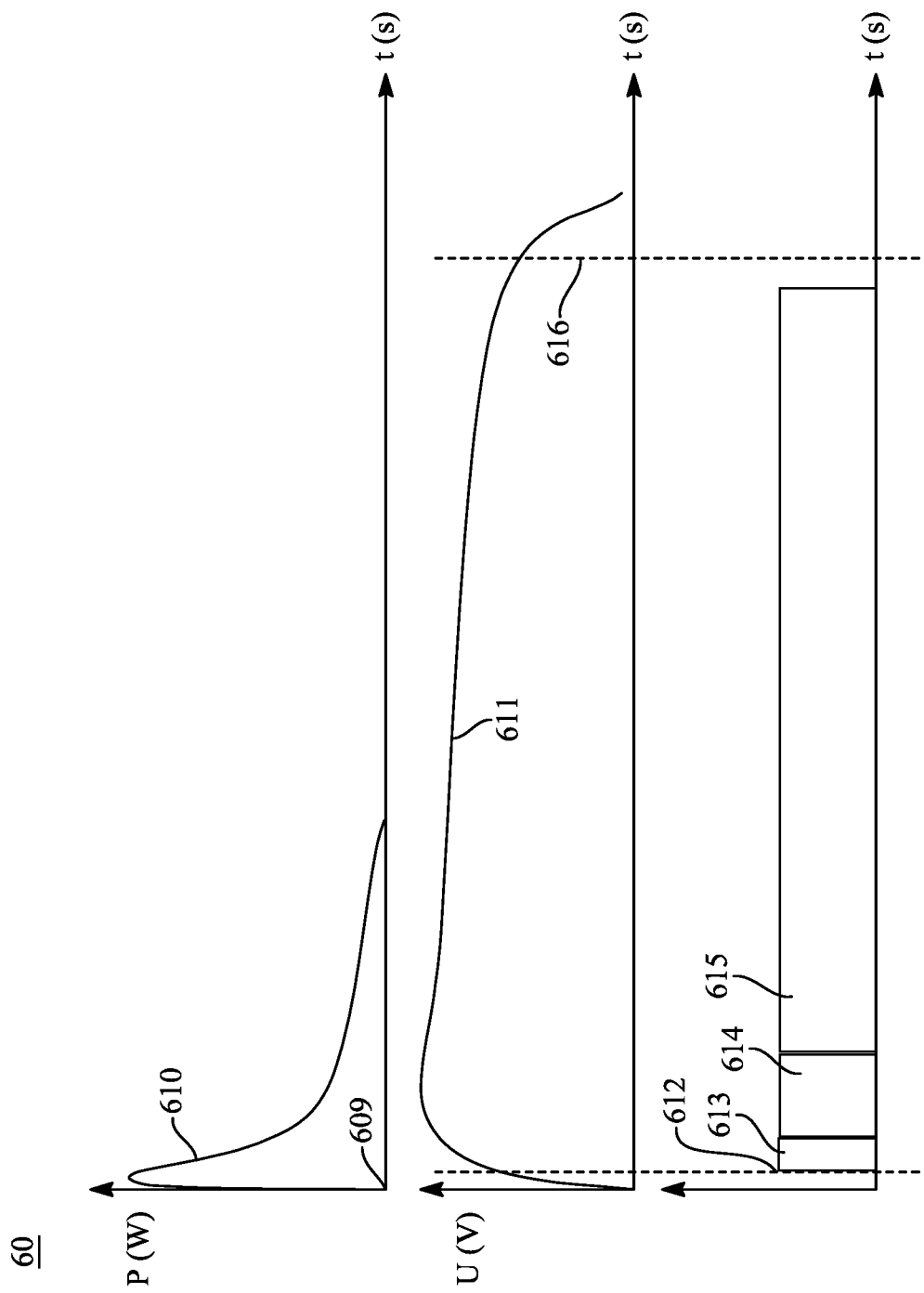
FIG. 6B demonstrates the water meter reading process of embodiment 60 of the system of the invention using a Low Power Wireless Area Network to communicate the water meter reading to the water company via a communication network, as a temporal diagram, showing operation as a function of time.

FIG. 6B demonstrates the water meter reading process of embodiment 60 of the system of the invention using a Low Power Wireless Area Network to communicate the water meter reading to the water company via a communication network, as a temporal diagram, showing operation as a function of time. In the top diagram power in watts is on the Y-axis, and time in seconds on the X-axis. In the middle diagram voltage is on the Y-axis and time in seconds on the X-axis. The lowest diagram shows the duration of different stages of the process, X-axis has time in seconds. The diagrams are superposed on the same X-axis, i.e., the time is the same on each of the three X-axes.

At 609 Electric power generation is triggered and torsional spring 514 is released. At 610 the Output power (I*U) is that of the generator 510. At 611 Output Voltage of the harvested power is in the energy storage, which are capacitors. At 612 the Operating voltage of the electronics 604 is reached. At 613 Microprocessor's operations are started.

At 614 sensor data is being read, which may include water temperature, pressure, and consumption, and processing of the data packet to be sent takes place. Optionally, the data packet can be encrypted. At 615 the data packet is transmitted using the LPWAN transceiver 605. Typically, the LPWAN transceiver sends the packet two times. At 616 Voltage of the energy storage is dropped below the operation voltage. Consequently, the electronics are dead, i.e., without power, before the moment 609 and after moment 616. The short use time of the electronics has the advantage that the power consumption of the water meter read out is low, and can thus be self-powered with the energy harvester 602 of the embodiment 50.

Any features of embodiment 60 may be readily combined or permuted with any of the other embodiments 30, 40, 50, 61, 70, 80, 90, 91, 92, 93 and/or 94 in accordance with the invention.

Figure 6C:
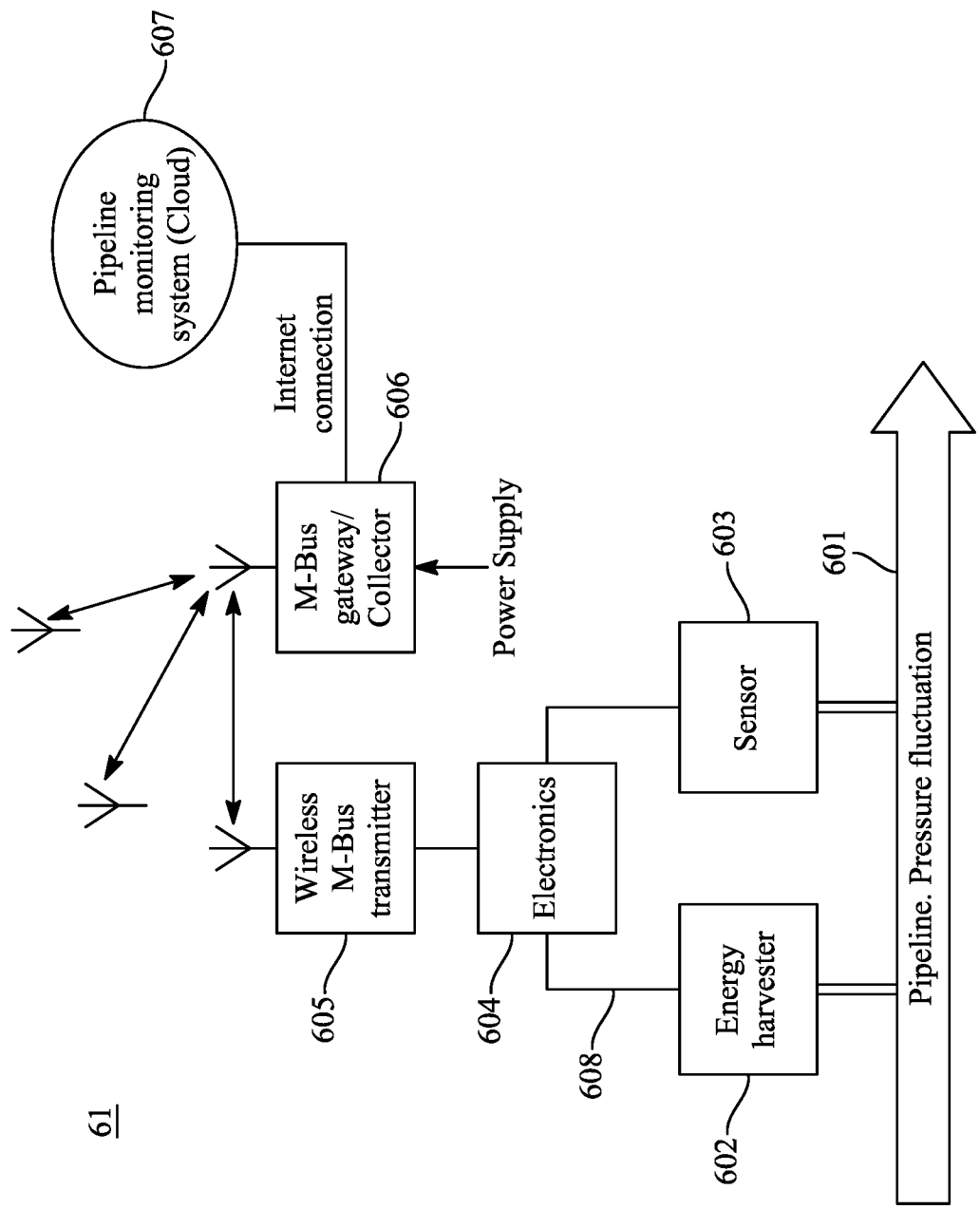
FIG. 6C demonstrates an embodiment 60C of the system of the invention using a Wireless M-Bus to communicate the water meter reading to the water company via a communication network.

FIG. 6C demonstrates an embodiment 61 of the system of the invention using a Wireless M-Bus to communicate the water meter reading to the water company via a communication network. This embodiment is similar to earlier embodiments 30 and 60, but communication of the water meter reading to the water department is realised via Wireless M-Bus transmitter 605, M-Bus gateway collector 606 which has its own power source, and typically an Internet connection to the pipeline monitoring system 607 in a cloud network. M-Bus (EN 13757-2, EN 13757-3) is a European standard for the remote reading of water meter, gas, or electricity meters.

In some embodiments the water meter readings are transmitted using Mode S "Stationary mode" in M-Bus protocol. Mode S is intended for unidirectional or bidirectional communications between the meter and a stationary or mobile device. A special transmit only sub-mode S1 is optimized for stationary battery-operated devices with a long header, and the sub-mode S1-m is specialized for mobile receivers. In mode S, the meter sends data spontaneously, either periodically or stochastically. Frame transmission from meters to other devices uses a bit rate 32.768 kbps, while communication in the opposite direction is carried out also at 32.768 kbps.

In Mode S1 the meter doesn't care if any receiver is present or not. The meter sends data and returns immediately in power-save mode without waiting for a response. This is a unidirectional communication. In some embodiments this unidirectional communication is powered by the energy harvester 602 to communicate the water meter reading in accordance with the invention.

Figure 6D:
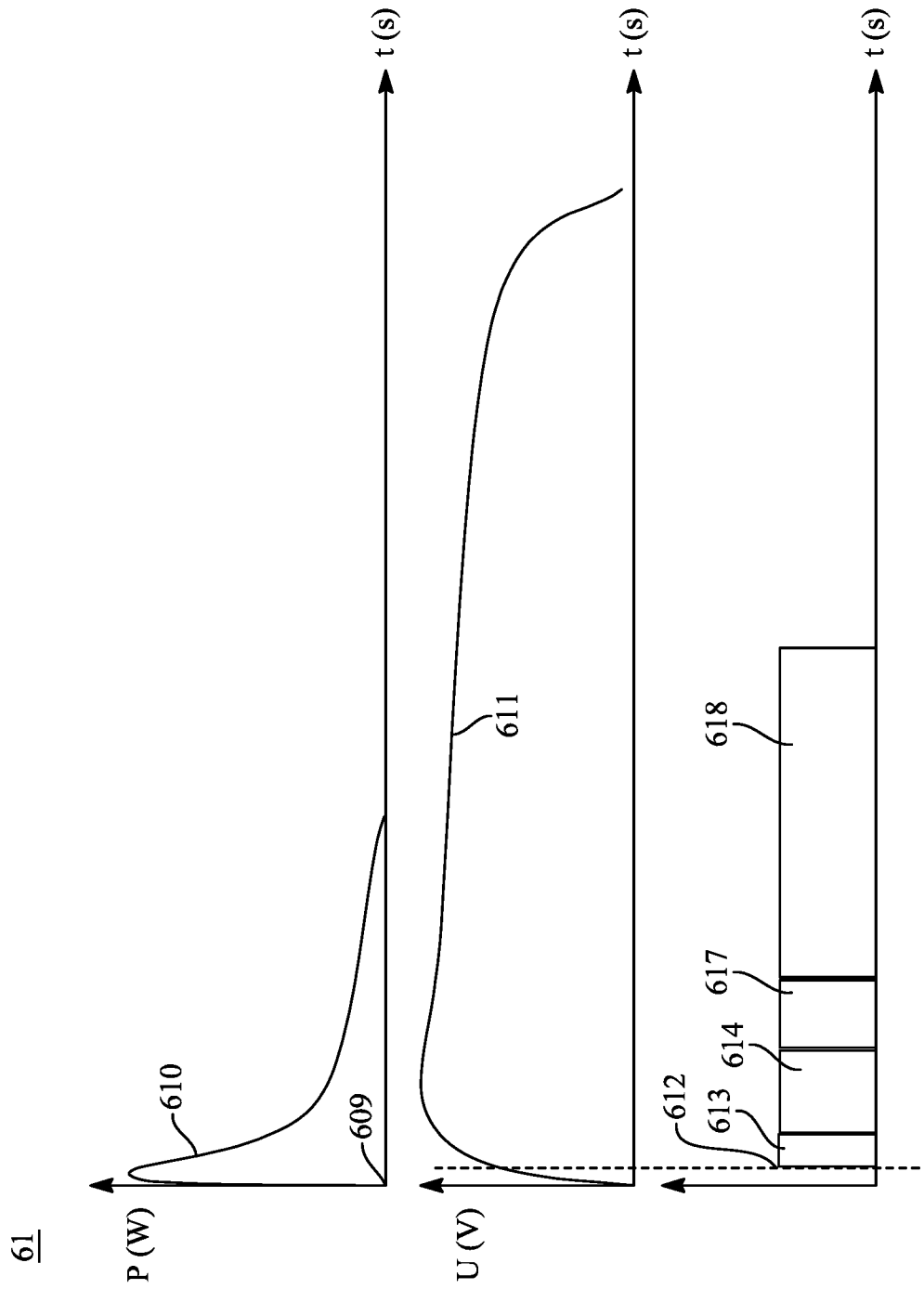
FIG. 6D demonstrates the water meter reading process of embodiment 60C of the system of the invention using a Wireless M-Bus to communicate the water meter reading to the water company via a communication network, as a temporal diagram, showing operation as a function of time.

FIG. 6D demonstrates the water meter reading process of embodiment 61 of the system of the invention using a Wireless M-Bus to communicate the water meter reading to the water company via a communication network, as a temporal diagram, showing operation as a function of time.

In the top diagram power in watts is on the Y-axis, and time in seconds on the X-axis. In the middle diagram voltage is on the Y-axis and time in seconds on the X-axis. The lowest diagram shows the duration of different stages of the process, X-axis has time in seconds. The diagrams are superposed on the same X-axis, i.e., the time is the same on each of the three X-axes.

At 609 Electric power generation is triggered and torsional spring 514 is released. At 610 the Output power (I*U) is that of the generator 510. At 611 Output Voltage of the harvested power is in the energy storage, which are capacitors. At 612 the Operating voltage of the electronics 604 is reached. At 613 Microprocessor's operations are started.

At 614 sensor data is being read, which may include water temperature, pressure, and consumption, and processing of the data packet to be sent takes place. Optionally, the data packet can be encrypted. At 615 the data packet is transmitted using the Wireless M-Bus transceiver 605.

Consequently, the electronics are dead, i.e., without power, before the moment 609 and after moment 618. The short use time of the electronics has the advantage that the power consumption of the water meter read out is low, and can thus be self-powered with the energy harvester 602 of the type 50.

Any features of embodiment 61 may be readily combined or permuted with any of the other embodiments 30, 40, 50, 60, and/or 70, 80, 90, 91, 92, 93 and/or 94 in accordance with the invention.

Figure 7:
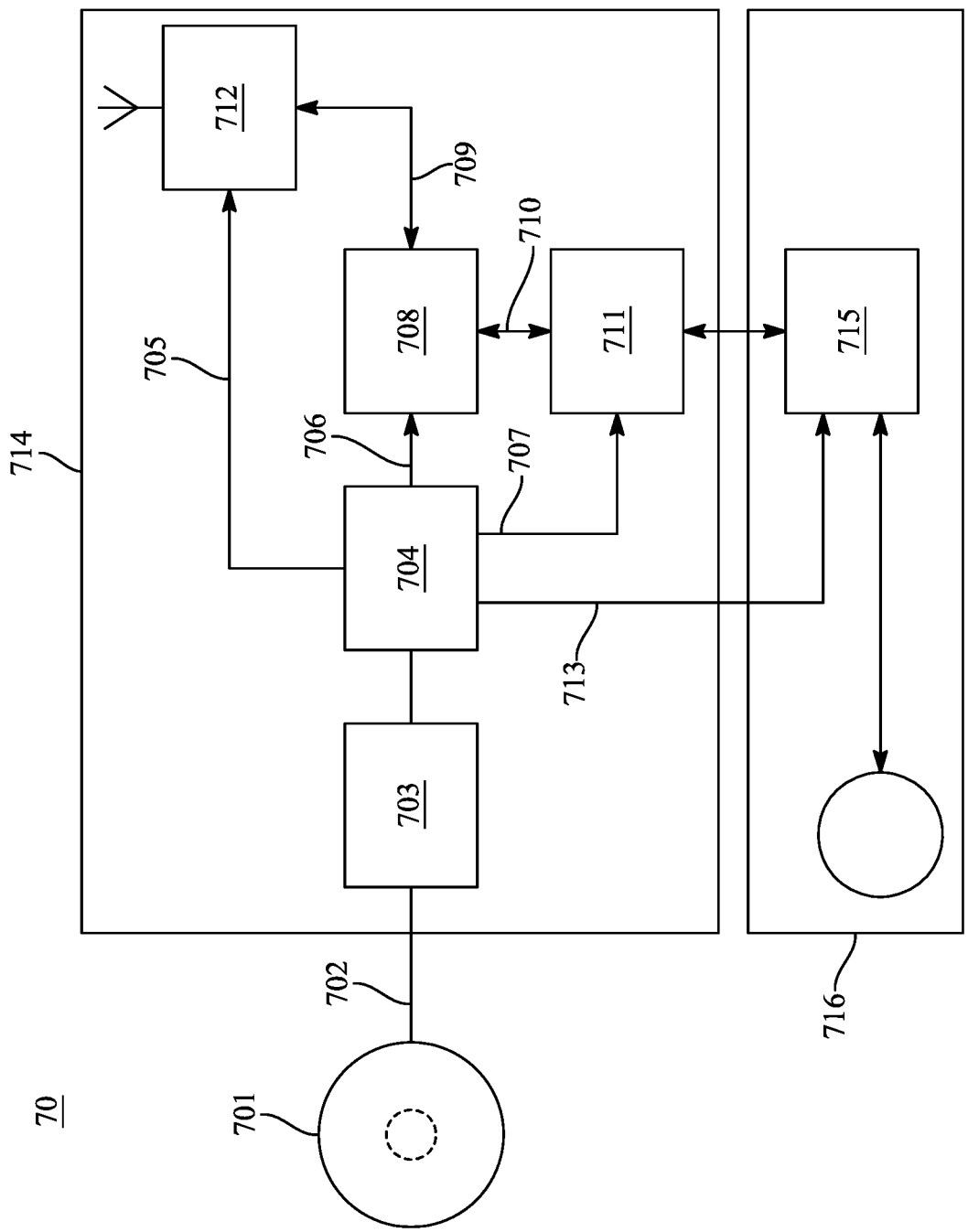
FIG. 7 demonstrates an embodiment 70 of the electronics of the system of the invention as a block diagram.

FIG. 7 demonstrates an embodiment 70 of the electronics of the system of the invention as a block diagram. Generator 701 provides electricity via wires 702 to the electronics 714. Diodes 703, or energy harvester chip, is capable to pump up the tail voltage 610. 704 is a capacitor bank providing energy storage. 705 is the power supply to wireless interface, 706 the power supply to microprocessor, and 707 is the power supply to sensor interface. 708 is the microprocessor and 709, 710 are the communication buses. 711 is the sensor interface and 712 the Communication interface, typically for a wired device. 716 is the sensor typically detecting any of the following: pressure, temperature, flow, volume, Chemical composition, and/or pH. 715 is the Value or data of the sensor that needs to be read, in this case typically the water meter reading. Optionally 713 may be used to supply power to sensor operations when the value 715 is read, in some embodiments. Communication technologies between 711-715 can be for example any of the following: M-Bus, PC Bus, CAN (Controller Area Network) Bus, UART (Universal Asynchronous Receiver-Transmitter).

In some embodiments the energy harvester could also be used to power a valve, motion sensor, or the like components of a water tap. For example, contactless public water taps at airports, bus stations, train stations or similar establishments could use the inventive energy harvester in some embodiments accordance with the invention.

It should be noted that the self-powered reading device of in accordance with the invention may also be combined with prior art battery free flow counters, for example the ones shown in US2015/0135852. In some embodiments of the invention, the self-powering technology of the energy harvester is integrated into a water meter. This type of a water meter could be installed just once, and from that moment the water meter would provide water meter readings perpetually to the water department for decades, centuries or possibly even longer times. In one preferable embodiment the flow counter of the aforementioned type measures, and powers the water consumption measurement itself. The inventive energy harvester uses the hydrostatic energy captured with the piston or the membrane to power the reading of that aforementioned water consumption measurement into memory. The said inventive energy harvester also powers the transmission of that measured reading from the memory, over a radio/microwave link, to the receiver at the water department.

Any features of embodiment 70 may be readily combined or permuted with any of the other embodiments 30, 40, 50, 60, 61, 80, 90, 91, 92, 93 and/or 94 in accordance with the invention.

Figure 8:
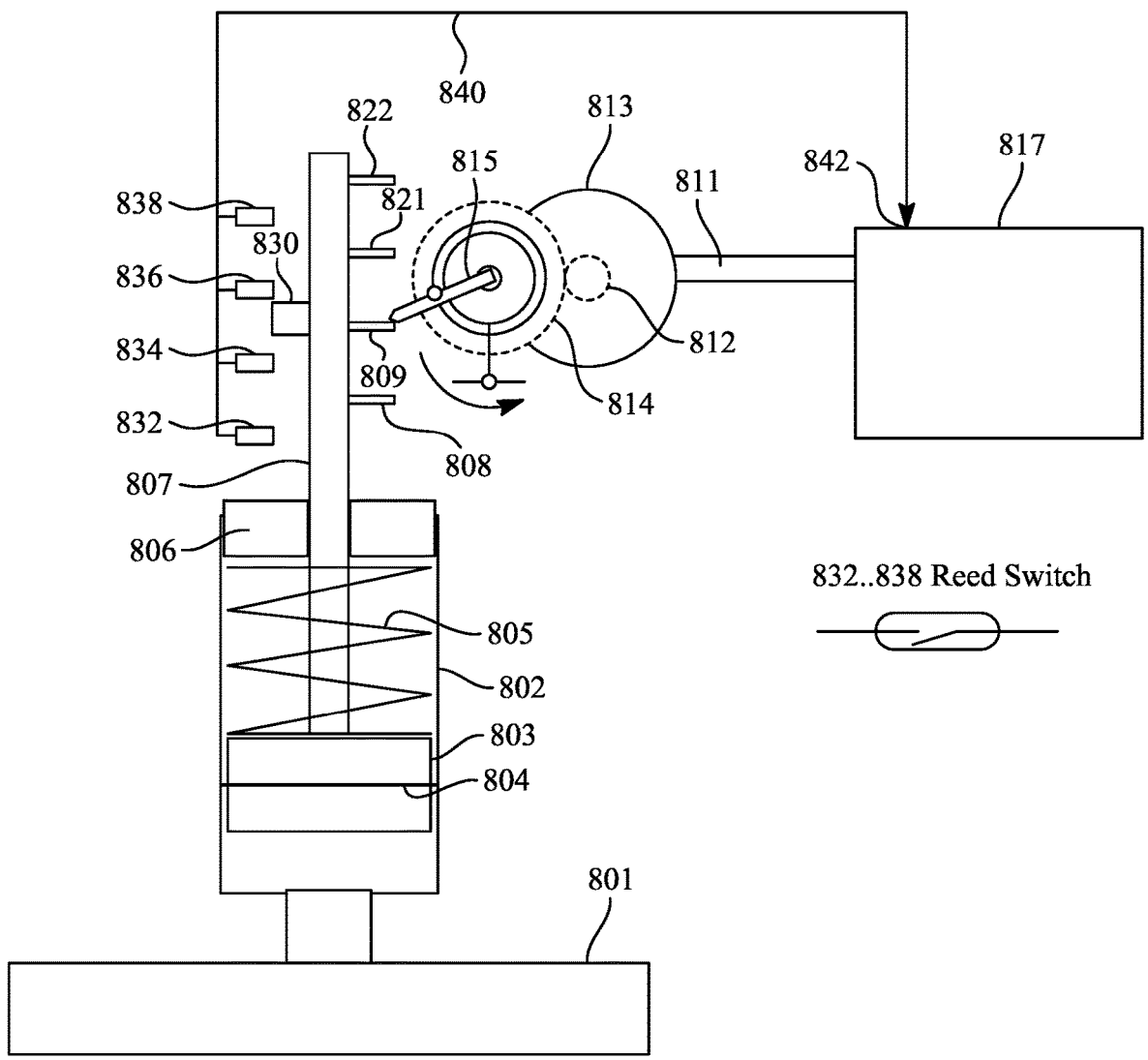
FIG. 8 demonstrates an advanced embodiment 80 where water consumption and pressure differences are measured with an inventive water meter self-powering device installed into the water pipeline network.

FIG. 8 demonstrates an embodiment 80 of the system of the invention as a schematic diagram in the initial state when the pressure in the water pipe is low, which is similar to embodiment 50, but has some additional differences. The cylinder bore 802 housing the piston 803 is installed in connection with the water pipeline network. The reference numerals with the first number 8 correspond to those with first number 5, e.g. spring loader 515 in FIG. 5 is similar to spring loader 815 to in FIG. 8.

There are 4 levers 808, 809, 821, 822 which interact with the spring loader 815. Corresponding to the levers 808, 809, 821, 822 there are magnetic reed switches 832, 834, 836, 838 on the other side of the shaft 807. As the shaft 807 moves, the magnet 830 moves past a reed switch 832, 834, 836, 838, at a certain water pressure. In some embodiments the magnet 830 could be set to meet reed switch 838 at 7 bar water pressure, reed switch 836 at 6 bar water pressure, reed switch 834 at 5 bar water pressure, and reed switch 832 at 4 bar water pressure. Ideally, the levers 808, 809, 821, 822 are set so that they go past the spring loader 815 right before the magnet 830 passes a reed switch. This way the electric power needed for processing the pressure read out from the reed switches 832, 834, 836, 838, is generated just before the read out is made, in an otherwise powerless system.

The pressure readouts are communicated from the reed switches 832, 834, 836, 838 through the wiring 840 to the digital inputs 842 of the electronics 817.

Any features of embodiment 80 may be readily combined or permuted with any of the other embodiments 30, 40, 50, 60, 61, 70, 80, 90, 91, 92, 93 and/or 94 in accordance with the invention.

Figure 9:
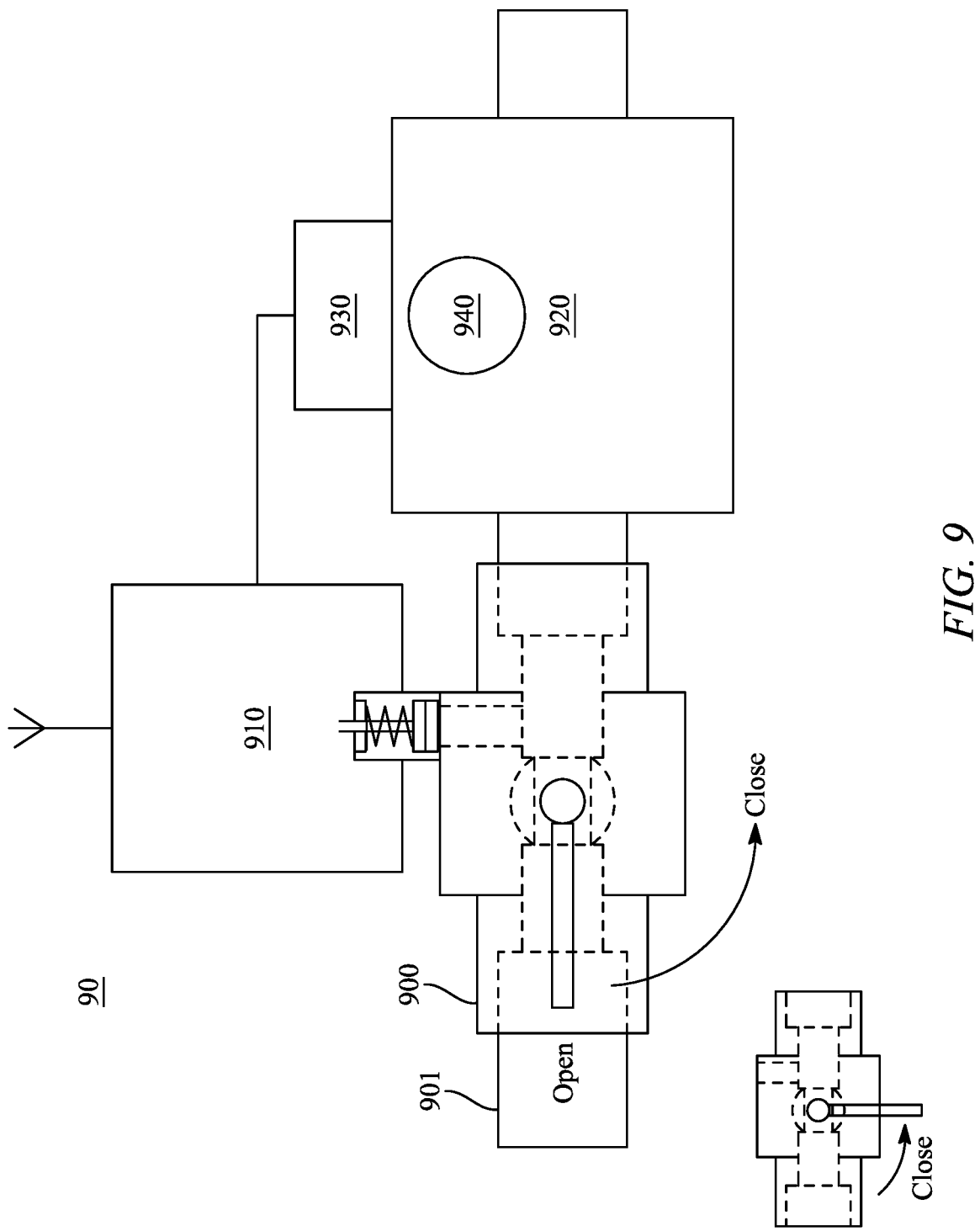
FIG. 9 demonstrates a schematic diagram 90 of how an embodiment of the invention is configured for ease of installation into a cut-off valve in a water pipeline network in accordance with the invention.

FIG. 9 presents a preferred installation embodiment 90 of a water meter 920, the energy harvesting system for the water meter reading and pressure measurement 910, and a cut-off valve 900. In this embodiment a water pressure fluctuation powered transmitter 910 integrated (or connected) to cut-off valve 900 helps installations when an existing water meter 920 is read by camera 930 or a pulse counter 940 and room for pipe 901 modification is limited. In these cases, the transmitter 910-valve 900 with standard connection dimensions eliminates the need for pipe modifications.

The transmitter 910 and valve 900 may be sold as a two-part kit in some preferable embodiments of the invention. Also, the transmitter 910, valve 900 and the readout electronics with a pulse counter 940 or a camera 930 may be sold as a three-part kit in some preferable embodiments of the invention. Further, the transmitter 910, valve 900 and the readout electronics with a pulse counter 940 or a camera 930, and a water meter may be sold as a four-part kit in some preferable embodiments of the invention.

In a preferential embodiment, a water meter mechanical counter 940 has at least one rotating permanent magnet and a Wiegand wire sensor to sense the position of the permanent magnet. When the permanent magnet passes the Wiegand wire sensor an electric pulse is generated. The electric pulses are counted by a counter 940 powered by the energy of the electric pulse. The counter 940 may be an iC-PMX Energy Harvesting Multiturn Counter from iC-Haus GmbH. The main benefit of the arrangement is that an external power supply is not needed for the counter 940. The counter 940 data is read by the counter interface 711 when the system is powered by a water pressure change in the cut-off valve 900.

In an alternative embodiment, the read out of the water meter is performed visually by recording a photographic image of the water meter consumption dial reading with a very low power camera, such as counter Camera NanEye- DS000501, or the like very low power footprint, low data footprint, miniature camera. The water meter 920 dial or display data is photographically recorded when the water pressure changes, and the water pressure change powers the use of the camera in accordance with the invention. The recorded photo of the water meter reading is then compressed and sent to the water department using the wireless transmitter 910, and the photograph is time stamped when it arrives to the water department computer server.

Any features of embodiment 90 may be readily combined or permuted with any of the other embodiments 30, 40, 50, 60, 61, 70, 80, 90, 91, 92, 93 and/or 94 in accordance with the invention.

FIGS. 10A, 10B, 10C, 10D shown an integrated self-powered water meter, which derives its operating power from the hydrostatic pressure changes in the water pipe network. Not all features in FIGS. 10A-D are drawn to scale, and some features may be bigger or smaller than as they appear in these figures.

Figure 10A:
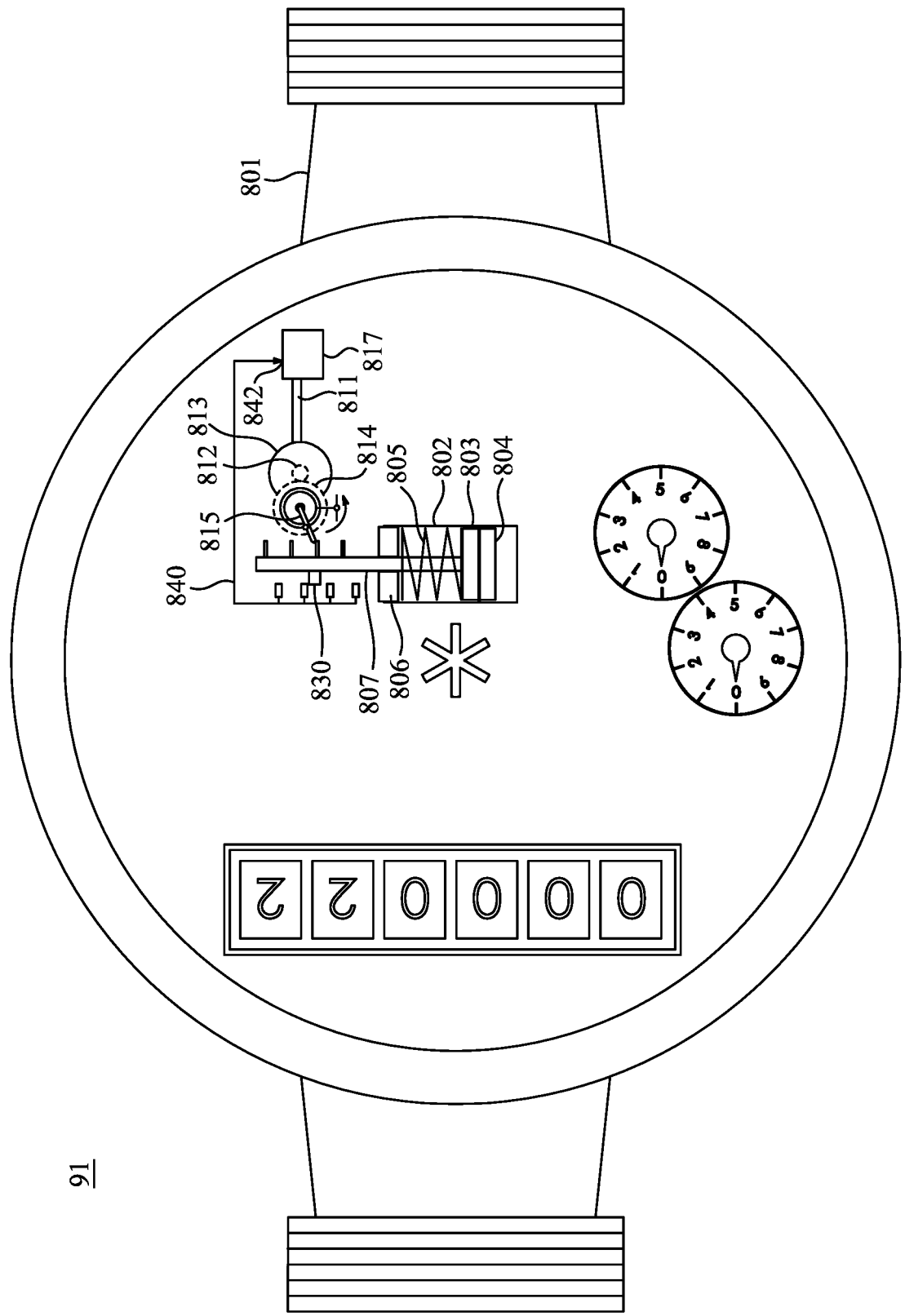
FIG. 10A shows an inventive integrated water meter as a schematic diagram, where the energy harvester is installed horizontally within the water meter to realise an embodiment 91 of a self-powered water meter.

FIG. 10A, embodiment 91 shows a configuration where the face of the piston does not oppose the fluid flow in the pipe. Piston movement is thus caused primarily by the hydrostatic pressure changes in the pipe network.

Figure 10B:
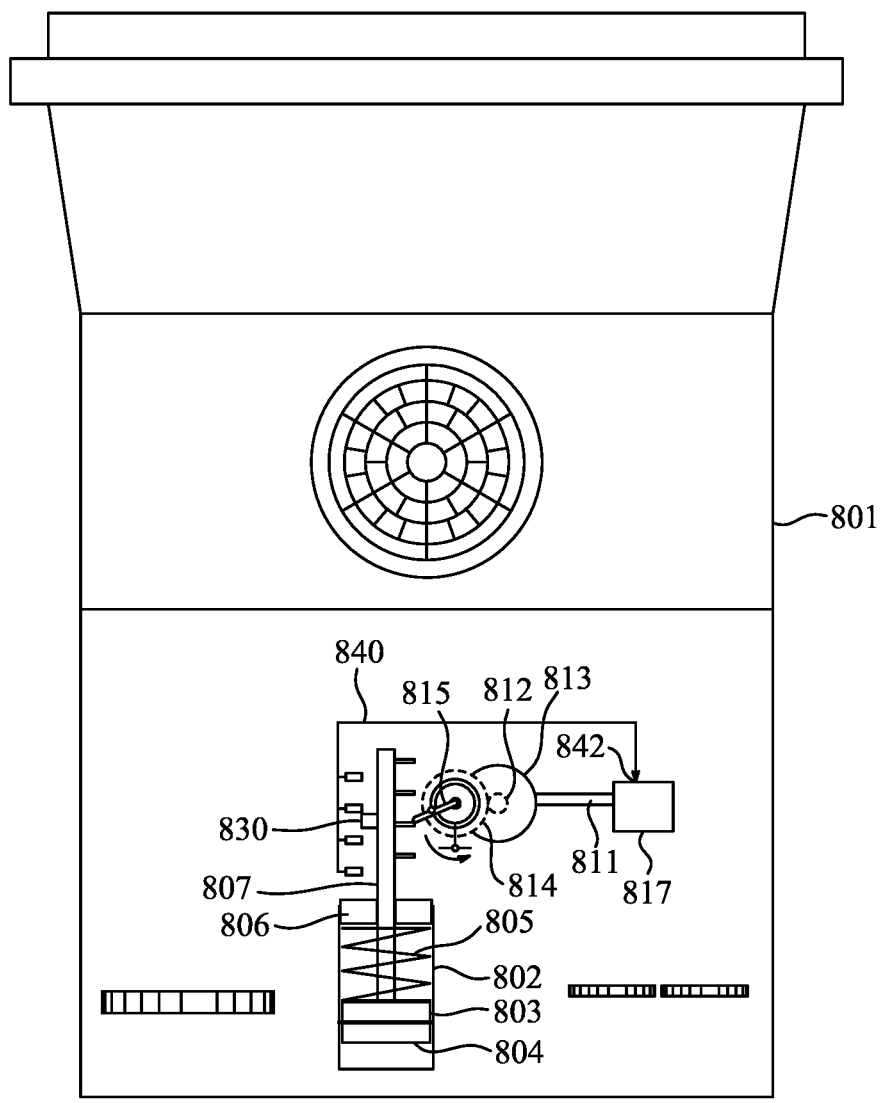
FIG. 10B shows an inventive integrated water meter as a schematic diagram, where the energy harvester is installed vertically within the water meter to realise an embodiment 92 of a self-powered water meter.

FIG. 10B, embodiment 92 shows a configuration where the energy harvester is below the liquid container of the water meter. The structural parts of the energy harvester 802-842 can also be configured so, that the piston 803 of the nergy harvesting system 802-842 is facing the top of the page.

Figure 10C:
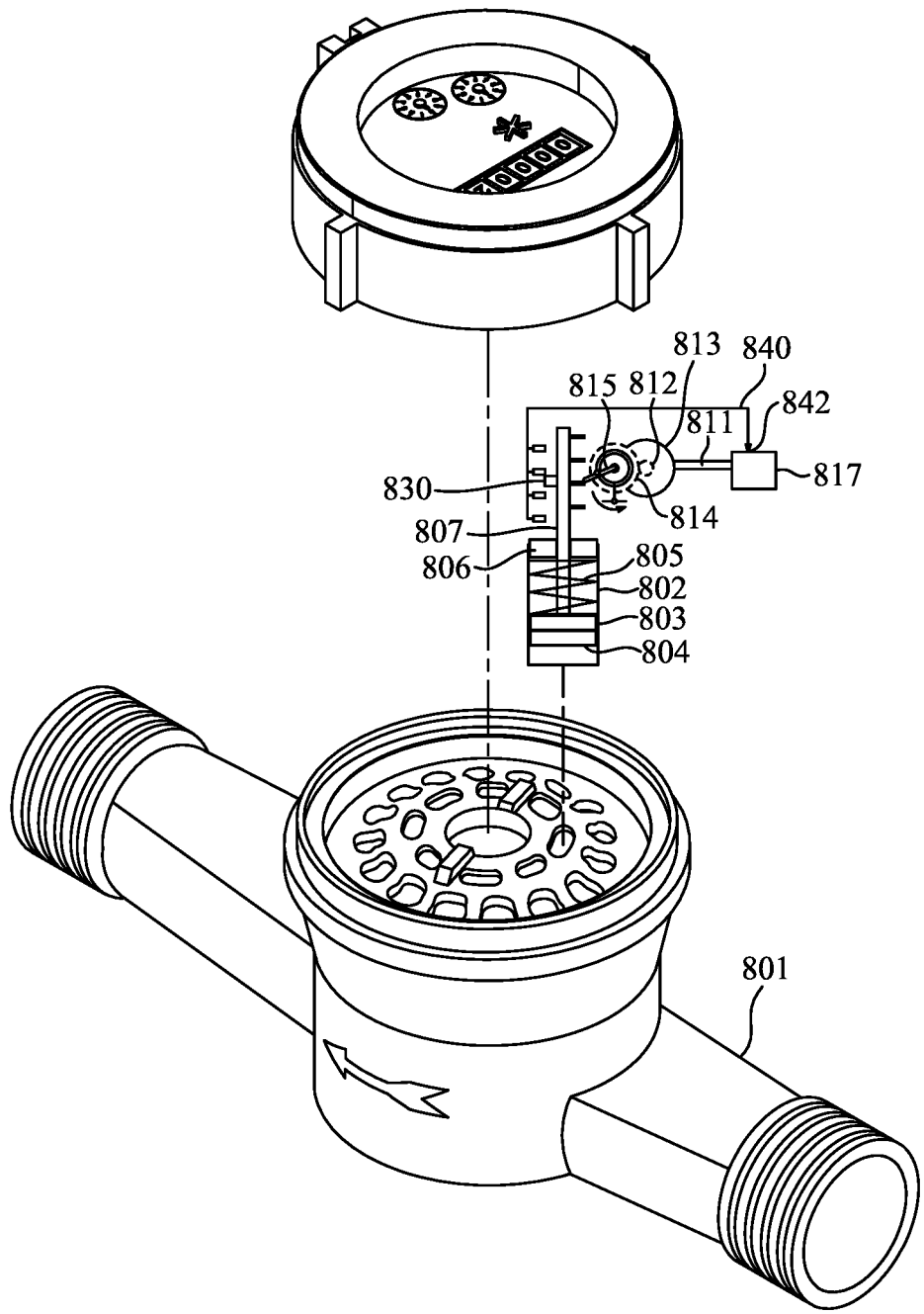
FIG. 10C shows an inventive integrated water meter as a schematic diagram, where the energy harvester is installed in a vertical configuration within the water meter, underneath the dial and the cap, perpendicular to water pipe fluid flow, to realise an embodiment 93 of a self-powered water meter.

FIG. 10C, embodiment 93 shows a configuration where the energy harvester is above the liquid container of the water meter.

Figure 10D:
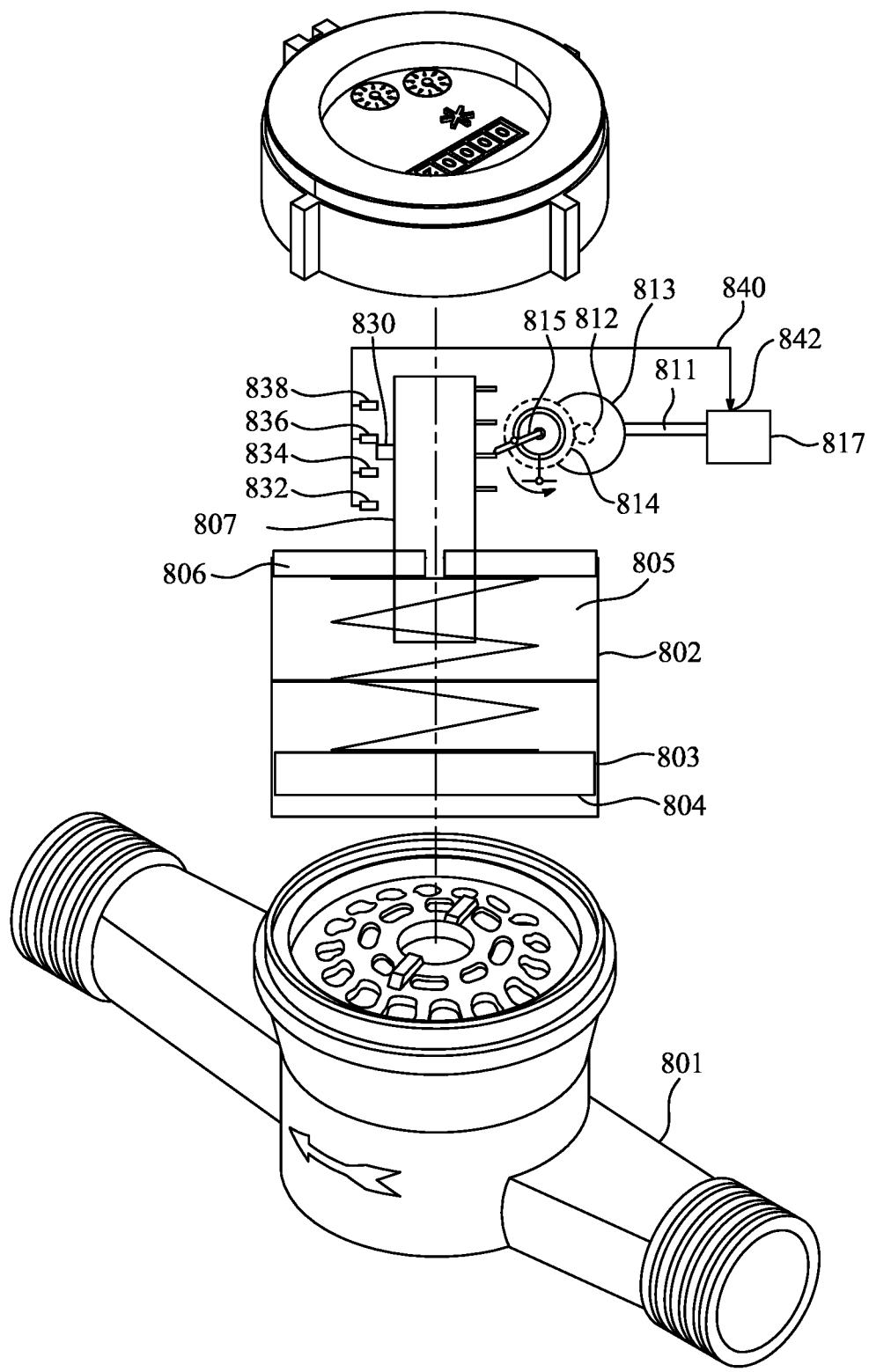
FIG. 10D shows an inventive integrated water meter as a schematic diagram, where the energy harvester has a maximum piston or membrane area and is installed in a vertical configuration within the water meter, underneath the dial and the cap, perpendicular to water pipe fluid flow, to realise an embodiment 94 of a self-powered water meter.

FIG. 10D, embodiment 94 shows a configuration that maximises the piston or membrane area, to capture as much hydraulic or hydrostatic power as possible, from the hydrostatic pressure change. The water flows in the pipe 801 in the direction of the arrow.

Any features of embodiments 91, 92, 93 and 94 may be readily combined or permuted with each other and with any of the other embodiments 30, 40, 50, 60, 61, 70, 80, and/or 90 in accordance with the invention.

The invention has been explained above with reference to the aforementioned embodiments and several commercial and industrial advantages have been demonstrated. The methods and arrangements of the invention allow water meter reading into perpetuity without changing the power source of the reading device.

The invention has been explained above with reference to the aforementioned embodiments. However, it is clear that the invention is not only restricted to these embodiments, but comprises all possible embodiments within the spirit and scope of the inventive thought and the following patent claims.

The invention claimed is:

1. An on-site self-powered water meter reading and transmitter system deriving operation power from pressure changes of a fluid in a water pipeline network, the reading and transmitter system comprising:
    a piston or a membrane configured to load a mechanical spring of a spring-loaded generator to extract mechanical energy from pressure changes in the water pipeline network,
        wherein the piston or membrane is mechanically driven by pressure changes in the water pipeline network,
        wherein the piston or membrane drives the mechanical spring storing mechanical energy, and
        wherein the mechanical spring when released is configured to drive an electro-magnetic motor and generate electric power configured to power a reading of a water meter and transmission of the water meter reading to a receiver.

2. The system as claimed in claim 1, wherein mechanical movement of the piston or membrane is converted to electrical energy, which is used to read and communicate the water meter reading of a user's water meter to a water department using a wireless or wireline communication network.

3. The system as claimed in claim 1, wherein the water meter comprises a mechanical or digital memory to record reading of water consumption.

4. The system as claimed in claim 1, wherein the water meter is configured to be read by the system when pressure changes in the water pipeline network occur.

5. The system as claimed in claim 1, wherein a pressure change in the water pipe network is initiated from or by a water department to read at least one water meter.

6. A system as claimed in claim 1, wherein at least one component of the: (i) the water meter reading or (ii) a transmission system is integrated into the water meter.

7. The system as claimed in claim 1, wherein a time stamp is attached to the water meter reading when the water meter reading is received at a water department, and wherein the water meter does not have a clock.

8. A method, comprising:
    using a piston or membrane to load a mechanical spring of a spring-loaded generator, to extract mechanical energy from pressure changes in a water pipeline network, comprising:
        mechanically driving the piston or membrane with pressure changes in the water pipeline network; and
        driving the mechanical spring storing mechanical energy using the piston or membrane;
    releasing the mechanical spring to drive an electro-magnetic motor and generate electrical power; and
    powering a reading of a water meter, and transmission of the water meter reading to a receiver, using the generated electrical power.

9. The method as claimed in claim 8, wherein mechanical movement of the piston or membrane is converted to electrical energy, which is used to read and communicate the water meter reading of a user's water meter to a water department using a wireless or wireline communication network.

10. The method as claimed in claim 8, wherein the water meter comprises a mechanical or digital memory to record reading of water consumption.

11. The method as claimed in claim 8, wherein the water meter is configured to be read when pressure changes in the water pipeline network occur.

12. The method as claimed in claim 8, wherein a pressure change in the water pipe network is initiated from or by a water department to read at least one water meter.

13. The method as claimed in claim 8, wherein at least one of: (i) a water meter reading or (ii) a transmission system is integrated into the water meter.

14. The method as claimed in claim 8, wherein a time stamp is attached to the water meter reading when the water meter reading is received at a water department, and wherein the water meter does not have a clock.

* * * * *